US010807458B2

(12) United States Patent
Nishizawa et al.

(10) Patent No.: US 10,807,458 B2
(45) Date of Patent: Oct. 20, 2020

(54) AXLE DRIVING APPARATUS FOR HYBRID UTILITY VEHICLE

(71) Applicant: KANZAKI KOKYUKOKI MFG. CO., LTD., Amagasaki-shi, Hyogo (JP)

(72) Inventors: Takashi Nishizawa, Amagasaki (JP); Tasuku Inoue, Amagasaki (JP); Hiroaki Hashima, Amagasaki (JP); Yoshitaka Kochidomari, Amagasaki (JP); Fumiaki Ito, Amagasaki (JP); Masato Arata, Amagasaki (JP); Koga Yamane, Amagasaki (JP)

(73) Assignee: KANZAKI KOKYUKOKI MFG. CO., LTD., Hyogo (JP)

( * ) Notice: Subject to any disclaimer, the term of this patent is extended or adjusted under 35 U.S.C. 154(b) by 136 days.

(21) Appl. No.: 16/058,241

(22) Filed: Aug. 8, 2018

(65) Prior Publication Data

US 2019/0047399 A1 Feb. 14, 2019

(30) Foreign Application Priority Data

Aug. 8, 2017 (JP) .................................. 2017-153475
Aug. 30, 2017 (JP) .................................. 2017-166093

(51) Int. Cl.
*B60K 6/442* (2007.10)
*B60K 6/365* (2007.10)
*B60K 6/38* (2007.10)
*B60K 6/40* (2007.10)
*B60K 6/387* (2007.10)
*B60K 6/543* (2007.10)
*B60K 6/52* (2007.10)
*F16H 37/02* (2006.01)

(52) U.S. Cl.
CPC .............. *B60K 6/442* (2013.01); *B60K 6/365* (2013.01); *B60K 6/387* (2013.01); *B60K 6/40* (2013.01);

(Continued)

(58) Field of Classification Search
CPC .................... B60K 6/442; B60K 6/365; B60K 2006/4816; B60K 2006/381; B60Y 2200/20
See application file for complete search history.

(56) References Cited

U.S. PATENT DOCUMENTS 7,108,087 B2 * 9/2006 Imai ...................... B60W 20/10
  180/65.23
8,585,523 B2 * 11/2013 Yamada ................. B60K 6/365
  475/282

(Continued)

FOREIGN PATENT DOCUMENTS

JP 2017087824 A 5/2017

*Primary Examiner* — Sherry L Estremsky
(74) *Attorney, Agent, or Firm* — Cantor Colburn LLP

(57) ABSTRACT

An axle driving apparatus may include a first rotary shaft connected to an internal combustion engine; a second connected to an electric motor; a third rotary shaft connected to a driving shaft of a wheel; an interlocking unit interlocking the first, second, and third rotary shaft; and an input and output switchover unit. The interlocking unit and the input and output switchover unit are structured to switch the interlocking unit between a first mode in which only the power of the internal combustion engine is output from the third rotary shaft, a second mode in which only the power of the electric motor is output from the third rotary shaft, a third mode in which the power of the internal combustion engine and the power of the electric motor are combined and output from the third rotary shaft, and a fourth mode in which the power of the internal combustion engine is output from the second rotary shaft to the electric motor.

5 Claims, 24 Drawing Sheets

(52) U.S. Cl.
CPC ................ *B60K 6/52* (2013.01); *B60K 6/543* (2013.01); *F16H 37/022* (2013.01); *B60Y 2200/20* (2013.01); *B60Y 2200/92* (2013.01); *B60Y 2400/72* (2013.01); *B60Y 2400/73* (2013.01)

(56) References Cited

U.S. PATENT DOCUMENTS

| | | | | |
|---|---|---|---|---|
| 8,813,885 | B2* | 8/2014 | Heap | B60W 20/00 |
| | | | | 180/65.265 |
| 8,915,815 | B2* | 12/2014 | Choi | B60K 6/365 |
| | | | | 475/5 |
| 8,956,265 | B2* | 2/2015 | Chin | B60W 30/18 |
| | | | | 477/84 |
| 9,227,505 | B2* | 1/2016 | Hata | B60K 6/365 |
| 9,415,772 | B2* | 8/2016 | Munsell | B60K 17/344 |
| 9,440,526 | B2* | 9/2016 | Okuwaki | F16H 48/06 |
| 9,663,102 | B2* | 5/2017 | Aoki | B60K 6/445 |
| 9,950,607 | B2* | 4/2018 | Littlefield | B60K 6/365 |
| 2010/0203995 | A1* | 8/2010 | Zhang | B60K 6/365 |
| | | | | 475/5 |
| 2012/0129638 | A1* | 5/2012 | Kaltenbach | B60W 10/06 |
| | | | | 475/5 |
| 2017/0120899 | A1 | 5/2017 | Sugimoto et al. | |
| 2019/0093737 | A1* | 3/2019 | Pan | B60K 6/445 |
| 2019/0100094 | A1* | 4/2019 | Alonso | F16H 3/725 |
| 2019/0135288 | A1* | 5/2019 | Cho | B60W 30/1882 |

\* cited by examiner

P-P CROSS-SECTIONAL VIEW

Q-Q CROSS-SECTIONAL VIEW

R-R CROSS-SECTIONAL VIEW

S-S CROSS-SECTIONAL VIEW

|  | SWITCHOVER LEVER | DRIVE SOURCE | | CLUTCH | BRAKE | | |
|---|---|---|---|---|---|---|---|
|  |  | ENGINE | MOTOR |  | FIRST | SECOND | THIRD (P) |
| ENGINE MODE |  | ON | OFF | ON | OFF | ON | — |
| EV MODE | F | OFF | ON | OFF | ON | OFF | — |
| POWER MODE |  | ON | ON | ON | OFF | OFF | — |
| REGENERATION MODE | N | ON | OFF (POWER GENERATION) | ON | OFF | OFF | ON |
| EV MODE | R | OFF | ON (REVERSE) | OFF | ON | OFF | — |

| | SWITCHOVER LEVER | DRIVE SOURCE | | CLUTCH | BRAKE | | |
|---|---|---|---|---|---|---|---|
| | | ENGINE | MOTOR | | FIRST | SECOND | PARKING |
| ENGINE MODE | | ON | OFF | ON | OFF | ON | OFF |
| EV MODE | F | OFF | ON | OFF | ON | OFF | OFF |
| POWER MODE | | ON | ON | ON | OFF | OFF | OFF |
| REGENERATION MODE | N | ON | OFF (POWER GENERATION) | ON | OFF | OFF | ON |
| EV MODE | R | OFF | ON (REVERSE) | OFF | ON | OFF | OFF |

| | SWITCHOVER LEVER | DRIVE SOURCE | | CLUTCH | BRAKE | | |
| --- | --- | --- | --- | --- | --- | --- | --- |
| | | ENGINE | MOTOR | | FIRST | SECOND | PARKING |
| ENGINE MODE | | ON | OFF | ON | OFF | ON | OFF |
| EV MODE | F | OFF | ON | OFF | ON | OFF | OFF |
| POWER MODE | | ON | ON | ON | OFF | OFF | OFF |
| REGENERATION MODE | N | ON | OFF (POWER GENERATION) | ON | OFF | OFF | ON |
| EV MODE | R | OFF | ON (REVERSE) | OFF | ON | OFF | OFF |

| | SWITCHOVER LEVER | DRIVE SOURCE | | CLUTCH | BRAKE | | |
|---|---|---|---|---|---|---|---|
| | | ENGINE | MOTOR | | FIRST | SECOND | PARKING |
| ENGINE MODE | | ON | OFF | ON | OFF | ON | OFF |
| EV MODE | F | OFF | ON | OFF | ON | OFF | OFF |
| POWER MODE | | ON | ON | ON | OFF | OFF | OFF |
| REGENERATION MODE | N | ON | OFF (POWER GENERATION) | ON | OFF | OFF | ON |
| EV MODE | R | OFF | ON (REVERSE) | OFF | ON | OFF | OFF |

| | SWITCHOVER LEVER | DRIVE SOURCE | | CLUTCH | BRAKE | | |
|---|---|---|---|---|---|---|---|
| | | ENGINE | MOTOR | | FIRST | SECOND | PARKING |
| ENGINE MODE | | ON | OFF | ON | OFF | ON | OFF |
| EV MODE | F | OFF | ON | OFF | ON | OFF | OFF |
| POWER MODE | | ON | ON | ON | OFF | OFF | OFF |
| REGENERATION MODE | N | ON | OFF (POWER GENERATION) | ON | OFF | OFF | ON |
| EV MODE | R | OFF | ON (REVERSE) | OFF | ON | OFF | OFF |

| | SWITCHOVER LEVER | DRIVE SOURCE | | CLUTCH | BRAKE | | |
|---|---|---|---|---|---|---|---|
| | | ENGINE | MOTOR | | FIRST | SECOND | PARKING |
| ENGINE MODE | | ON | OFF | ON | OFF | ON | OFF |
| EV MODE | F | OFF | ON | OFF | ON | OFF | OFF |
| POWER MODE | | ON | ON | ON | OFF | OFF | OFF |
| REGENERATION MODE | N | ON | OFF (POWER GENERATION) | ON | OFF | OFF | ON |
| EV MODE | R | OFF | ON (REVERSE) | OFF | ON | OFF | OFF |

AXLE DRIVING APPARATUS FOR HYBRID UTILITY VEHICLE

CROSS REFERENCE TO RELATED APPLICATION

The present invention claims priority under 35 U.S.C. § 119 to Japanese Application No. 2017-153475 filed Aug. 8, 2017, and to Japanese Application No. 2017-166093 filed Aug. 30, 2017, the entire contents of both of which are incorporated herein by reference.

BACKGROUND OF THE INVENTION

Field of the Invention

At least an embodiment of the present invention relates to techniques of an axle driving apparatus and a hybrid vehicle including the same.

Description of Related Art

Conventionally, a utility vehicle (hereinafter referred to as a "UTV") which is a hybrid vehicle suitable for traveling over wildland, rough terrain, swampland, a mud place, and the like is known.

In general, a known configuration of a UTV includes a lightweight body frame and an axle driving apparatus that realizes four-wheel drive. The UTV realizes high traveling performance over rough terrain and the like.

As an axle driving apparatus that can be mounted on such a UTV, an axle driving apparatus for a hybrid vehicle has been developed which is configured to supplement (hereinafter also referred to as assist) power of an internal combustion engine with an electric motor. For example, a technique of the axle driving apparatus for a hybrid vehicle is disclosed in JP-A 2017-087824 Gazette to be described below.

In the conventional axle driving apparatus for a hybrid vehicle disclosed in JP-A 2017-087824 Gazette, one of an AWD mode, an EV mode, an assist mode, and a regeneration mode can be selected by operating a select SW. In the AWD mode, the vehicle travels in a state where rear wheels are driven by an internal combustion engine and front wheels are driven by an electric motor. In the EV mode, the vehicle travels in a state where only the front wheels are driven by the electric motor. In the assist mode, the vehicle travels in a state where the rear wheels are driven by the internal combustion engine and the electric motor assists driving force of the internal combustion engine. In the regeneration mode, the electric motor is driven by the internal combustion engine to generate electric power.

Such a conventional axle driving apparatus for a hybrid vehicle allows a driver to select and switch over to a travel mode according to usage.

SUMMARY OF THE INVENTION

However, with the conventional axle driving apparatus disclosed in JP-A 2017-087824 Gazette, the vehicle cannot travel by using only the internal combustion engine. Therefore, for example, in a case where the electric motor breaks down or the battery is completely used up, there is a possibility that the vehicle cannot travel.

At least an embodiment of the present invention has been made in view of the above circumstances, and at least an embodiment of the present invention provides an axle driving apparatus capable of switching between various travel modes and having a mode allowing a vehicle to travel by using only an internal combustion engine, and a hybrid vehicle including the same.

In other words, the axle driving apparatus according to at least an embodiment of the present invention includes: a first rotary shaft to which power of an internal combustion engine can be input; a second rotary shaft to which power of an electric motor can be input and can output power to the electric motor that serves as a generator; a third rotary shaft which can output power to a driving shaft of a wheel; an interlocking unit which interlocks the first rotary shaft, the second rotary shaft, and the third rotary shaft such that power can be transmitted to one another; and an input and output switchover unit which enables an input and output system of the interlocking unit to be artificially switched over. By the input and output switchover unit, the interlocking unit can be switched over among a first mode, a second mode, a third mode, and a fourth mode. In the first mode, only the power of the internal combustion engine is output from the third rotary shaft. In the second mode, only the power of the electric motor is output from the third rotary shaft. In the third mode, the power of the internal combustion engine and the power of the electric motor are combined and output from the third rotary shaft. In the fourth mode, the power of the internal combustion engine is output from the second rotary shaft to the electric motor.

According to such a configuration, a driver can artificially change the travel mode according to the condition of a traveling place and the intended usage of the vehicle. Therefore, it is possible to easily select an optimal travel mode according to the situation.

In addition, in the axle driving apparatus according to at least an embodiment of the present invention, the interlocking unit is configured as a planetary gear mechanism including: an internal gear which is interlocked with the first rotary shaft; a sun gear which is interlocked with the second rotary shaft; a plurality of planetary gears which meshes with the internal gear and the sun gear; and a planetary carrier which supports the plurality of planetary gears and is interlocked with the third rotary shaft. The input and output switchover unit includes a clutch, a first brake, and a second brake. The clutch is provided on the first rotary shaft and can engage and disengage power transmission from the internal combustion engine. The first brake can fix the internal gear and can fix the first rotary shaft in a non-rotatable manner by fixing the internal gear. The second brake can fix the sun gear and can fix the second rotary shaft by fixing the sun gear. The clutch can be engaged and disengaged and the first brake and the second brake can be turned on and off, independently from one another.

According to such a configuration, it is possible to easily change a driving mode.

In addition, in the axle driving apparatus according to at least an embodiment of the present invention, by the input and output switchover unit, the first mode can be selected in which the clutch is engaged, the first brake is turned off, the second brake is turned on, and only the power of the internal combustion engine is output from the third rotary shaft.

According to such a configuration, a hybrid vehicle can travel only by power of the internal combustion engine.

In addition, in the axle driving apparatus according to at least an embodiment of the present invention, by the input and output switchover unit, the second mode can be selected in which the clutch is disengaged, the first brake is turned on, the second brake is turned off, and only the power of the electric motor is output from the third rotary shaft.

According to such a configuration, a hybrid vehicle can travel only by power of the electric motor.

In addition, in the axle driving apparatus according to at least an embodiment of the present invention, by the input and output switchover unit, the third mode can be selected in which the clutch is engaged, the first brake is turned off, the second brake is turned off, and the power of the internal combustion engine and the power of the electric motor are combined and output from the third rotary shaft.

According to such a configuration, a hybrid vehicle can travel by combining power of the internal combustion engine and power of the electric motor.

In addition, a hybrid vehicle according to at least an embodiment of the present invention includes the axle driving apparatus according to a first or a second aspect of at least an embodiment of the present invention. The hybrid vehicle further includes a third brake which can fix the third rotary shaft in a non-rotatable manner. By the input and output switchover unit, the fourth mode can be selected in which the clutch is engaged, the first brake is turned off, the second brake is turned off, the third brake is turned on, and the third rotary shaft is fixed in a non-rotatable manner, and the power of the internal combustion engine is output from the second rotary shaft to the electric motor.

According to such a configuration, the electric motor can generate electric power by using power of the internal combustion engine, and a battery can be charged.

In addition, a hybrid vehicle according to at least an embodiment of the present invention includes the axle driving apparatus according to the first or the second aspect of at least an embodiment of the present invention. The hybrid vehicle further includes a continuously variable transmission which is provided between the internal combustion engine and the first rotary shaft. The continuously variable transmission changes speed of the power of the internal combustion engine and inputs the power to the first rotary shaft.

According to such a configuration, the speed change range can be widened in the mode of driving by power of the internal combustion engine.

The effects of at least an embodiment of the present invention are as follows.

According to the axle driving apparatus and the hybrid vehicle including the same according to at least an embodiment of the present invention, the axle driving apparatus capable of switching between various travel modes and having a mode allowing the vehicle to travel by using only the internal combustion engine, and the hybrid vehicle including the same can be provided.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5A is a schematic view illustrating the position of a P-P cross section, and FIG. 5B illustrates a schematic view illustrating the position of a Q-Q cross section;

FIG. 8A is a schematic view illustrating the position of an R-R cross section, and FIG. 8B illustrates a schematic view illustrating the position of an S-S cross section;

FIG. 11A is a diagram illustrating a configuration of the driving mode switchover unit, and FIG. 11B is a diagram illustrating operation status of each unit in each driving mode;

FIG. 14A is a diagram illustrating a switching condition of each unit in the ENGINE mode, and FIG. 14B is a schematic diagram illustrating a power transmission condition to each unit in the ENGINE mode;

FIG. 15A is a diagram illustrating a switching condition of each unit in the EV mode, and FIG. 15B is a schematic diagram illustrating a power transmission condition to each unit in the EV mode;

FIG. 16A is a diagram illustrating a switching condition of each unit in the POWER mode, and FIG. 16B is a schematic diagram illustrating a power transmission condition to each unit in the POWER mode;

FIG. 17A is a diagram illustrating a switching condition of each unit in the REGENERATION mode, and FIG. 17B is a schematic diagram illustrating a power transmission condition to each unit in the REGENERATION mode; FIG. 18A is a diagram illustrating a switching condition of each unit in the EV mode during reversing, and FIG. 18B is a schematic diagram illustrating a power transmission condition to each unit in the EV mode during reversing.

DETAILED DESCRIPTION OF PREFERRED EMBODIMENTS

Next, the best mode for carrying out the invention will be described.

First, the entire configuration of a utility vehicle (UTV) including an axle driving apparatus according to an embodiment of the present invention will be described.

Figure 1:
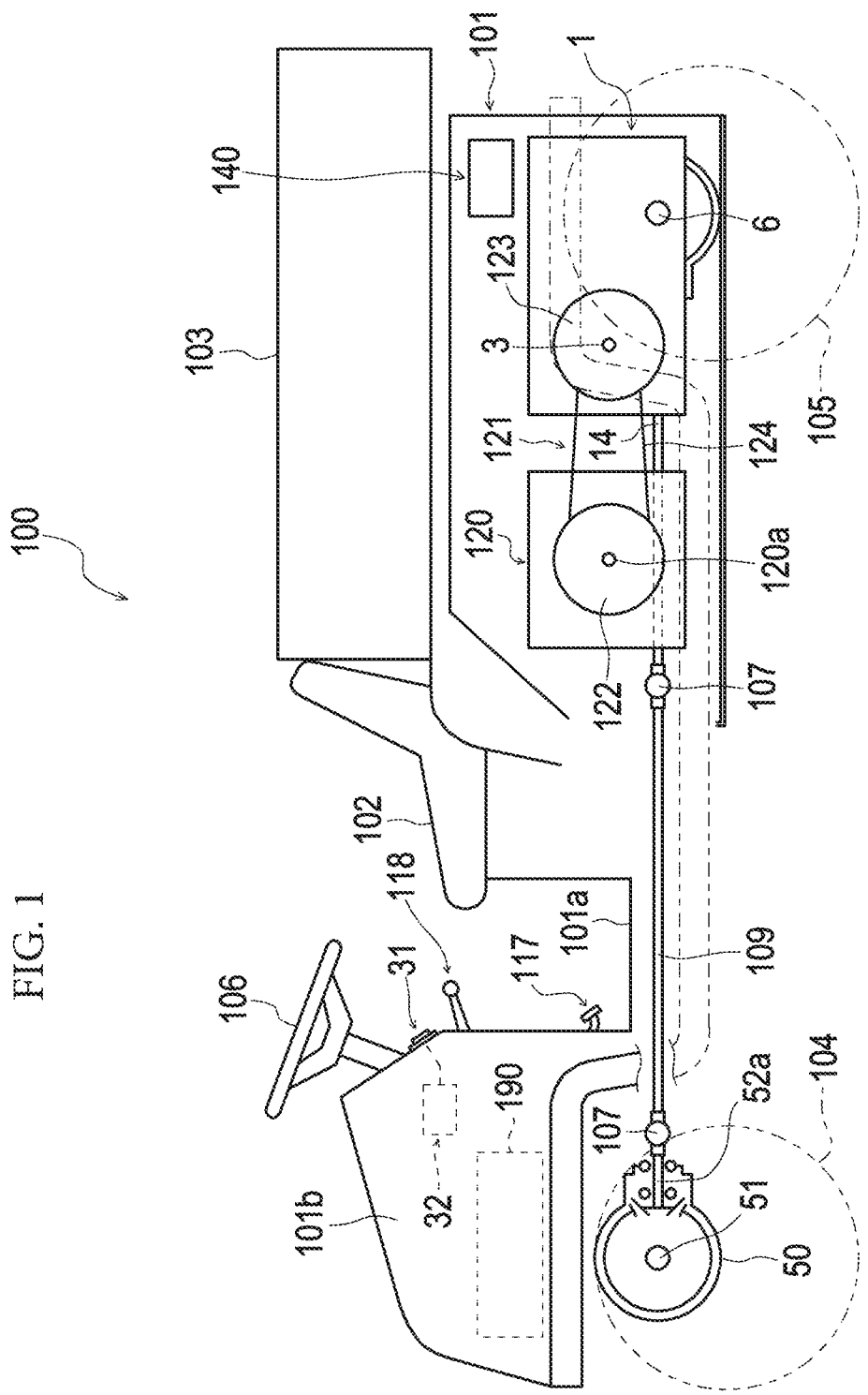
FIG. 1 is a schematic side view illustrating the entire configuration of a hybrid vehicle including an axle driving apparatus according to an embodiment of the present invention.
Figure 2:
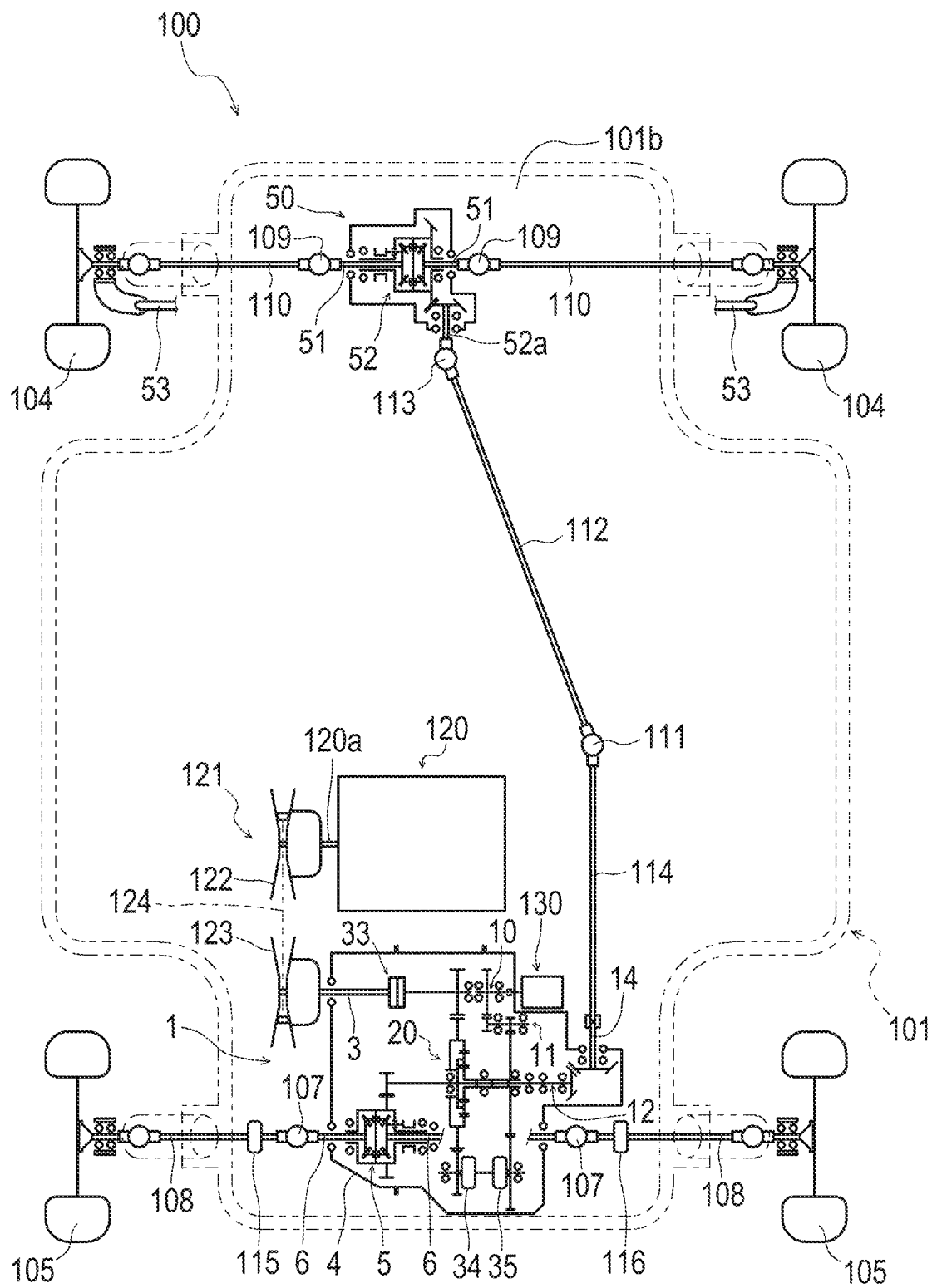
FIG. 2 is a schematic plan view illustrating the entire configuration of the hybrid vehicle including the axle driving apparatus according to the embodiment of the present invention.

As illustrated in FIGS. 1 and 2, in a UTV 100, a platform 101a is disposed on a body frame 101, and a front cover 101b is disposed in front of the platform 101a. Part of the body frame 101 located behind the platform 101a is formed to be one step higher than the platform 101a. A driver's seat 102 is disposed at the front end of the part of the body frame 101 formed to be one step higher than the platform 101a. A cargo bed 103 is disposed behind the driver's seat 102. A pair of right and left front wheels 104, 104 and a pair of right and left rear wheels 105, 105 are suspended in the front and rear of the body frame 101, respectively. A steering wheel 106 for steering the front wheels 104, 104 is disposed on the upper portion of the front cover 101b.

An internal combustion engine 120 is disposed below the cargo bed 103 on the body frame 101. The internal combustion engine 120 is elastically supported (mounted in a vibration isolated manner) on the body frame 101 via a rubber vibration isolator. An output shaft 120a horizontally projects from the internal combustion engine 120 to a lateral side of the internal combustion engine 120. The output shaft 120a is connected to a belt-type automatic continuously variable transmission (hereinafter referred to as a "CVT") 121 which is a main transmission disposed on a lateral side of the internal combustion engine 120.

The CVT 121 includes an input pulley 122 fixed to the output shaft 120a of the internal combustion engine 120, an output pulley 123 fixed to an engine-side input shaft 3, and a V belt 124 wound around the input pulley 122 and the output pulley 123. The input pulley 122 is a split pulley, and the groove width of the input pulley 122 around which the V belt 124 is wound is changed according to the rotation speed of the internal combustion engine 120 (the output shaft 120a). If the groove width of the input pulley 122 changes, the V belt 124 moves between the output shaft 120a and the engine-side input shaft 3, and the gear ratio between the input pulley 122 and the output pulley 123 is changed. For example, the lower the rotation speed of the internal combustion engine 120, the wider the groove width of the input pulley 122, and the speed reduction ratio is increased.

An axle driving apparatus 1 according to an embodiment of the present invention is disposed behind the internal combustion engine 120 and on a lateral side of the CVT 121.

Figure 3:
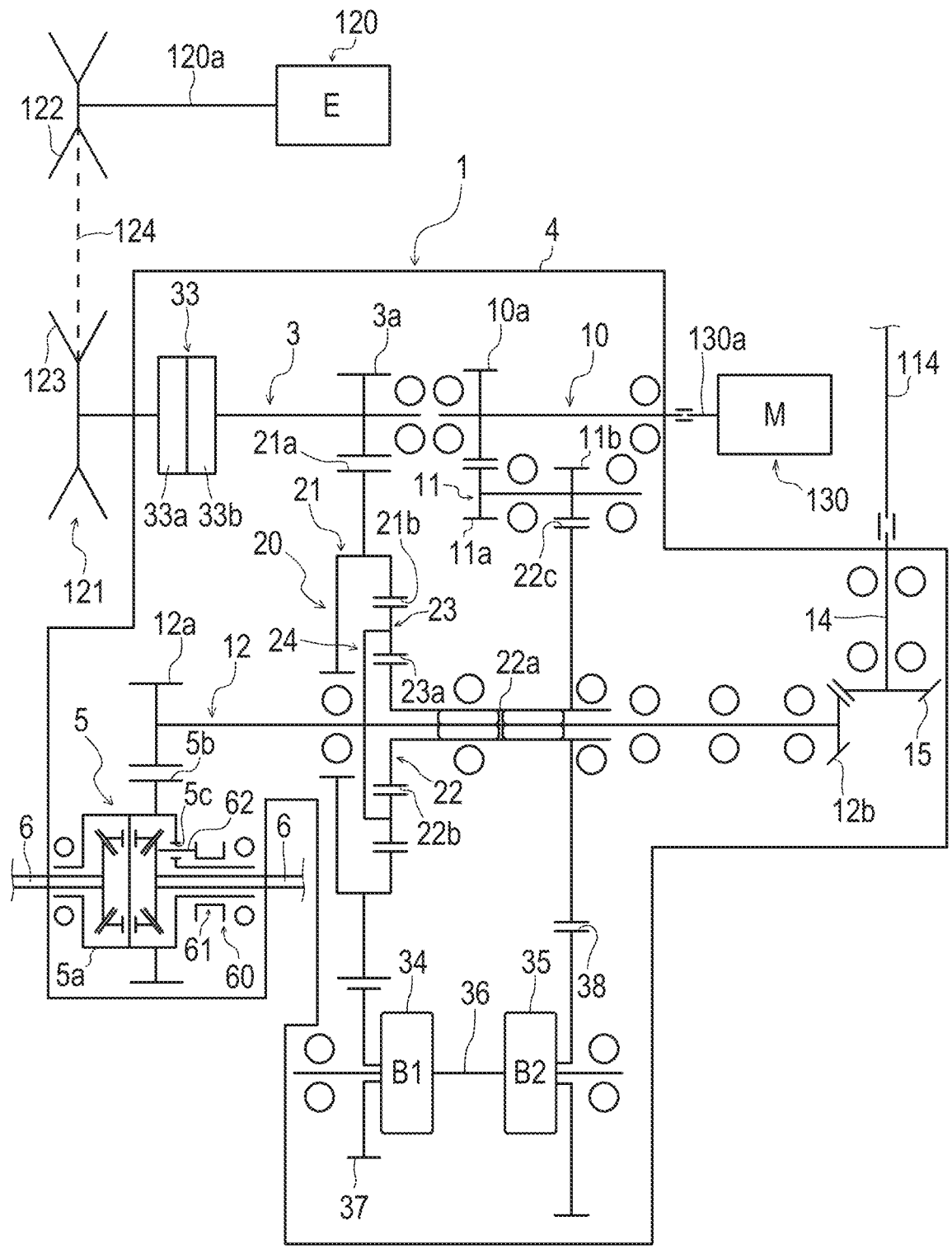
FIG. 3 is a schematic diagram illustrating the entire configuration of the axle driving apparatus according to the embodiment of the present invention.
Figure 4:
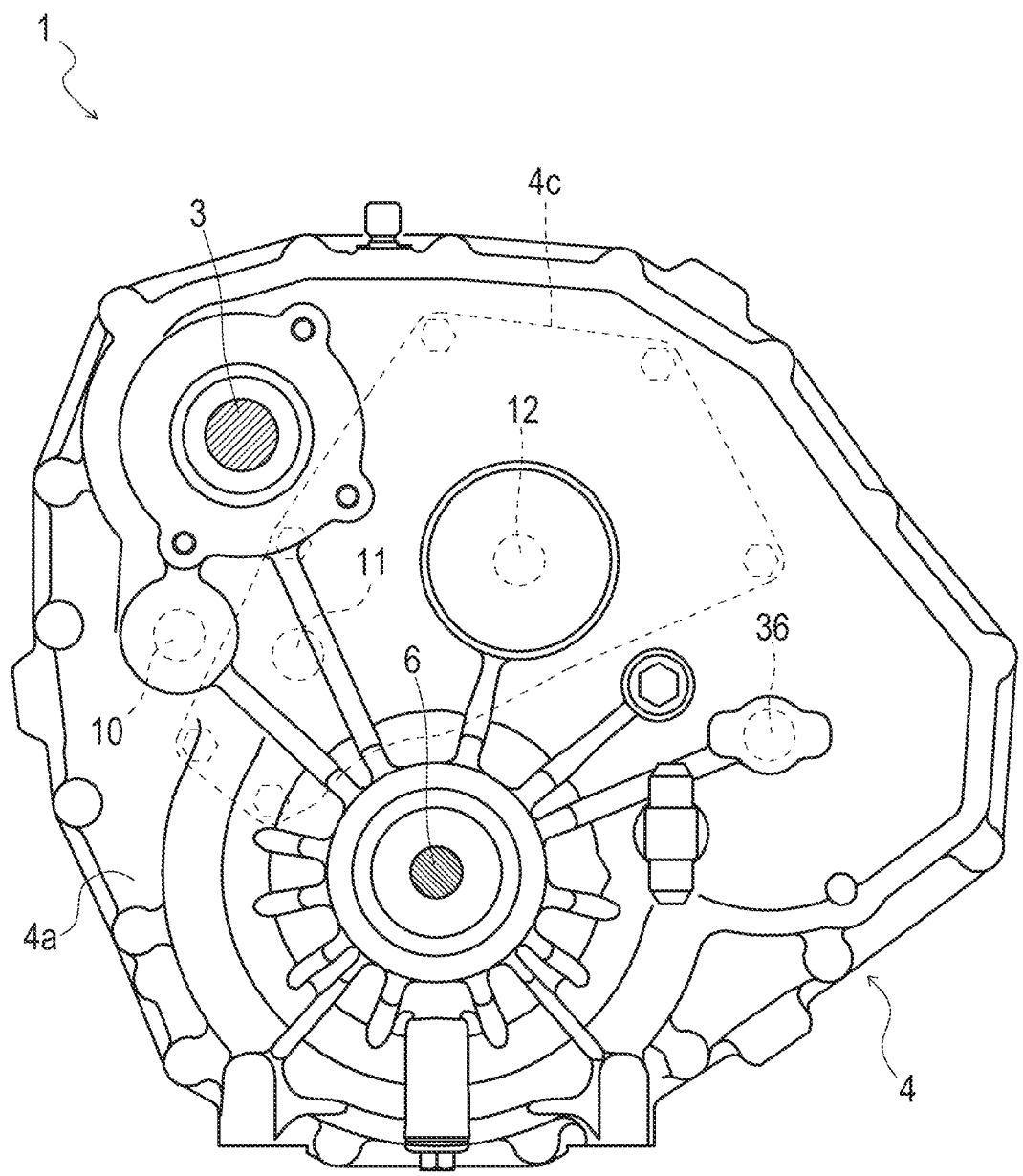
FIG. 4 is a schematic side view illustrating the entire configuration of the axle driving apparatus according to the embodiment of the present invention.
Figure 5A:
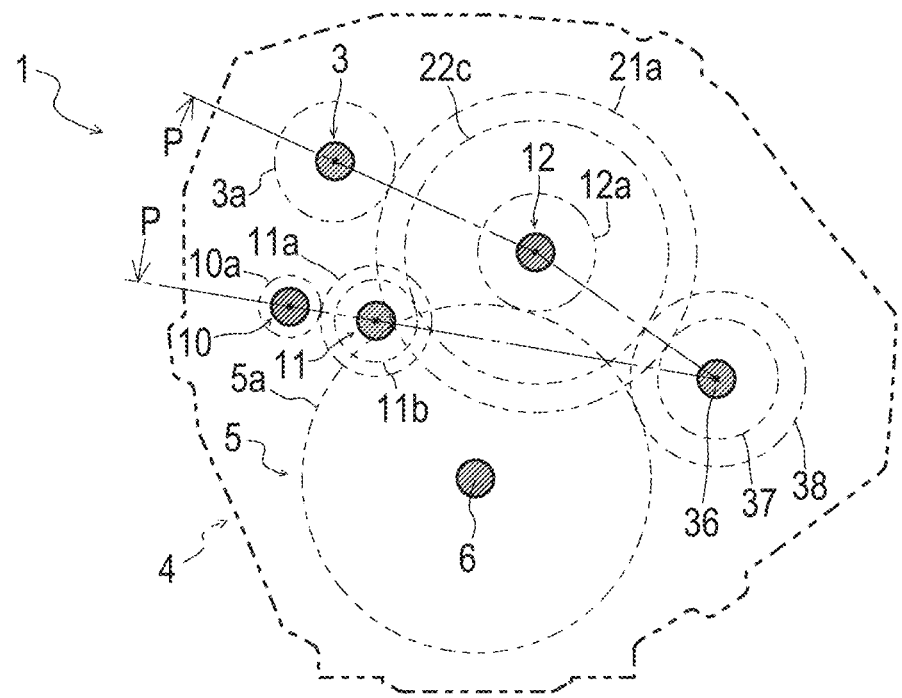
FIGS. 5A and 5B are schematic views (part 1) illustrating a positional relationship of respective shafts in the axle driving apparatus.
Figure 5B:
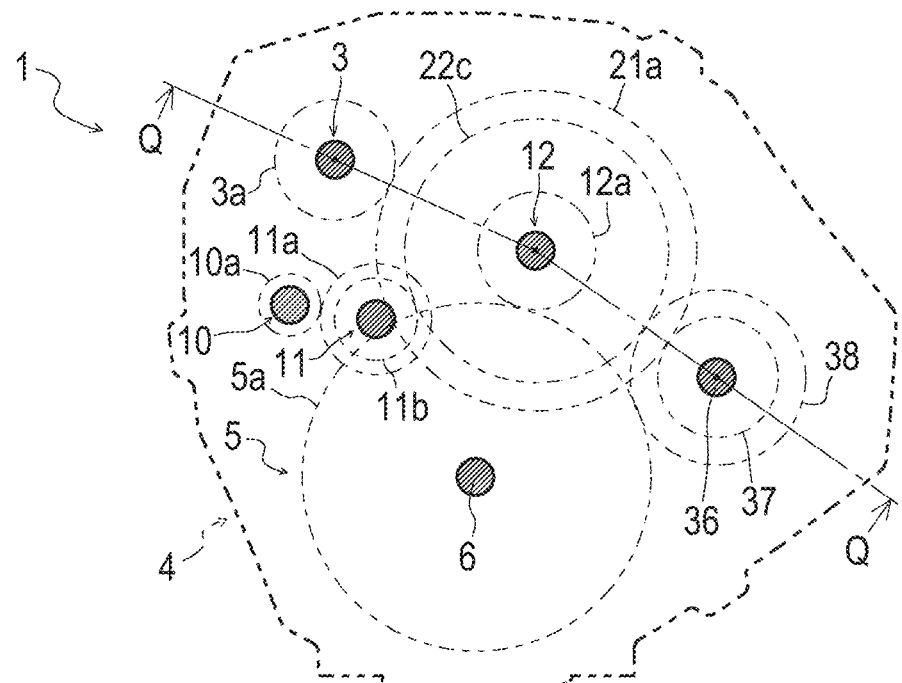
Figure 6:
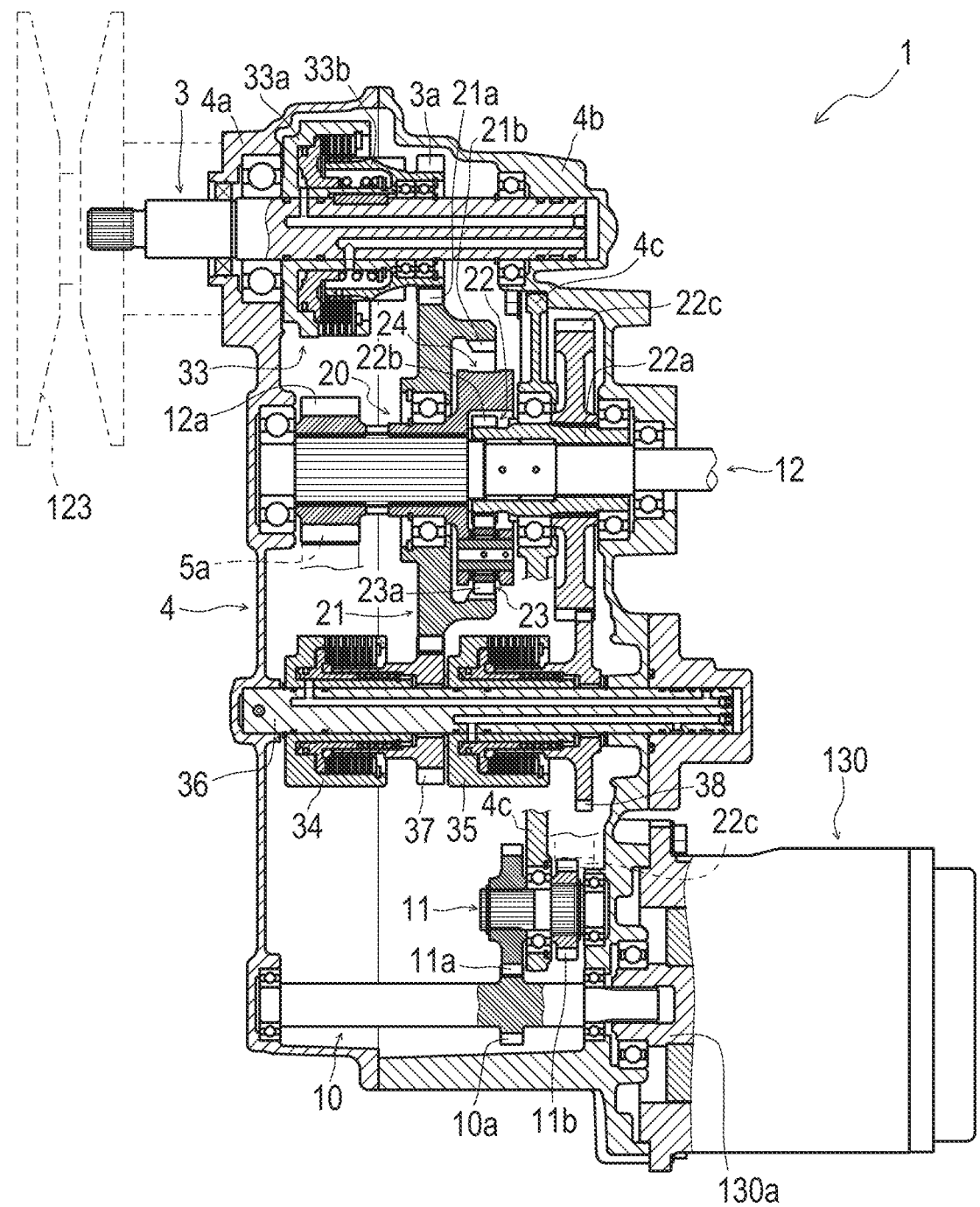
FIG. 6 is a detailed cross-sectional view illustrating the axle driving apparatus in the P-P cross section in FIG. 5A.
Figure 7:
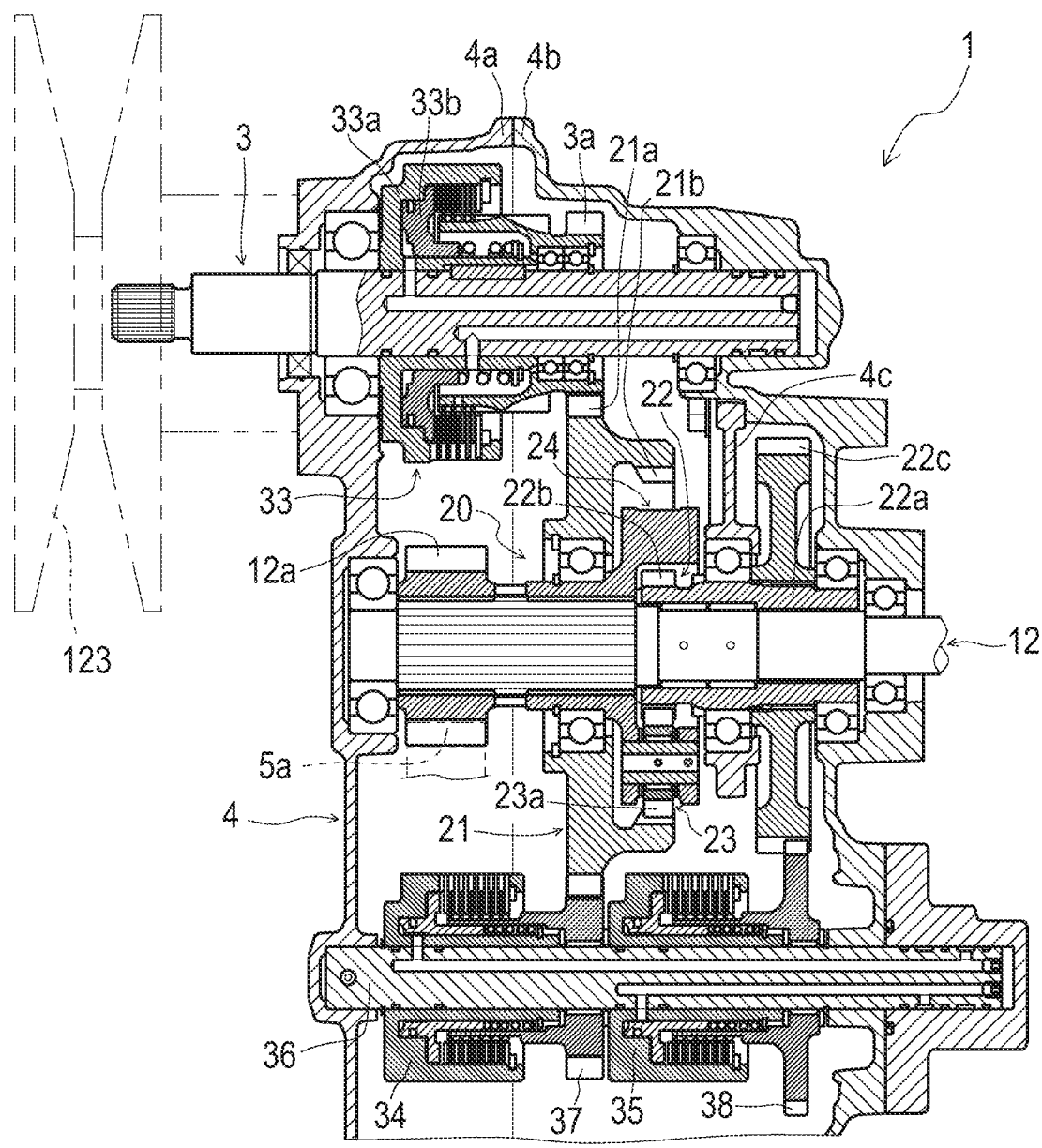
FIG. 7 is a detailed cross-sectional view illustrating the axle driving apparatus in the Q-Q cross section in FIG. 5B.
Figure 8A:
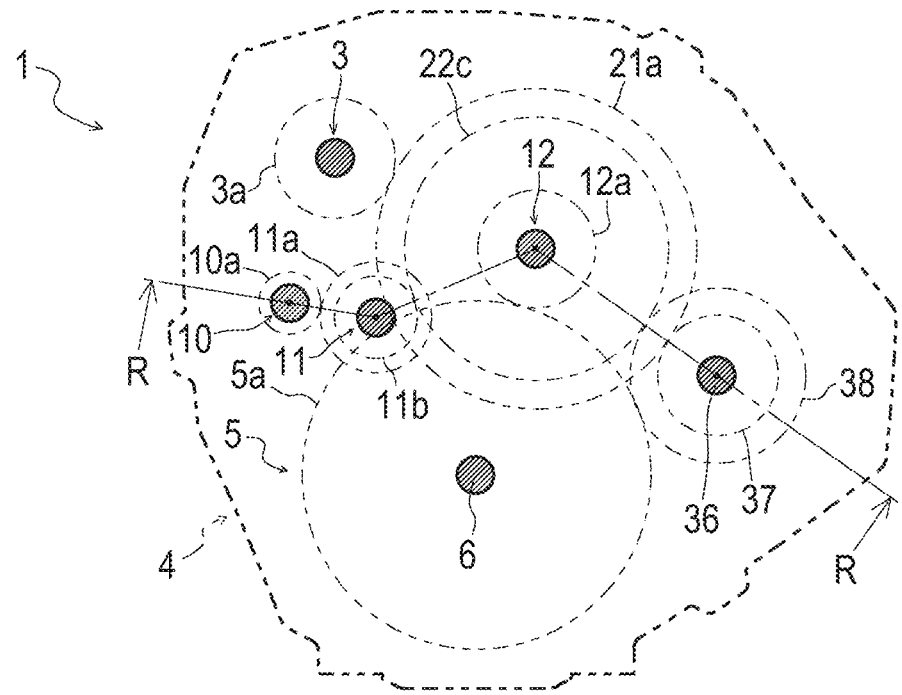
FIGS. 8A and 8B are schematic views (part 2) illustrating a positional relationship of the respective shafts in the axle driving apparatus.
Figure 8B:
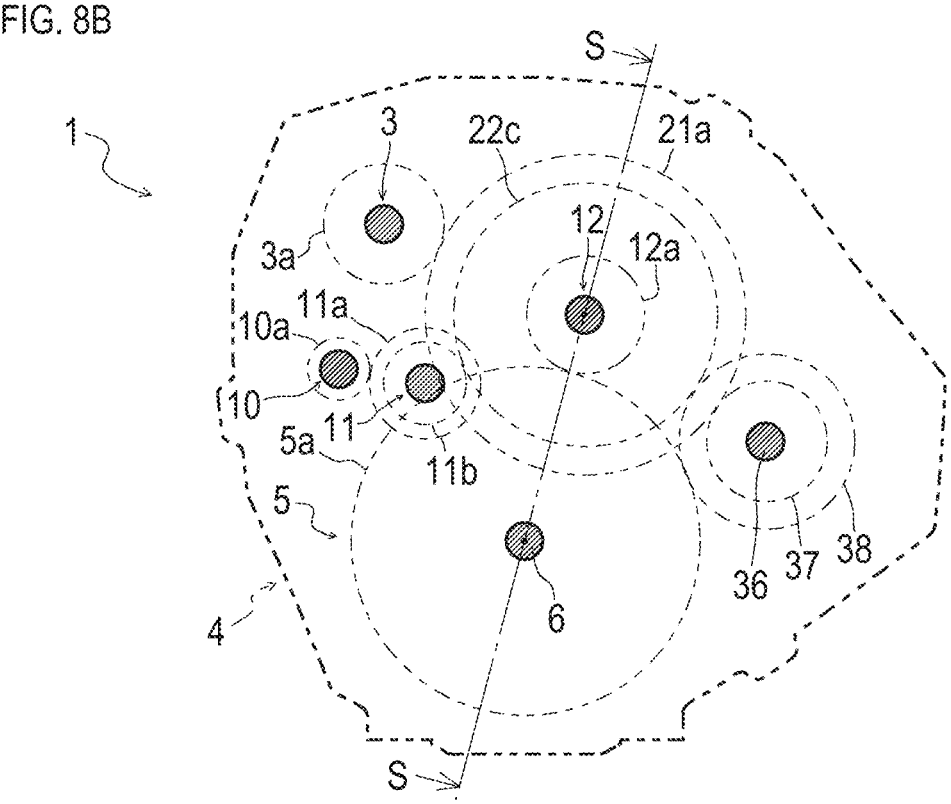
Figure 9:
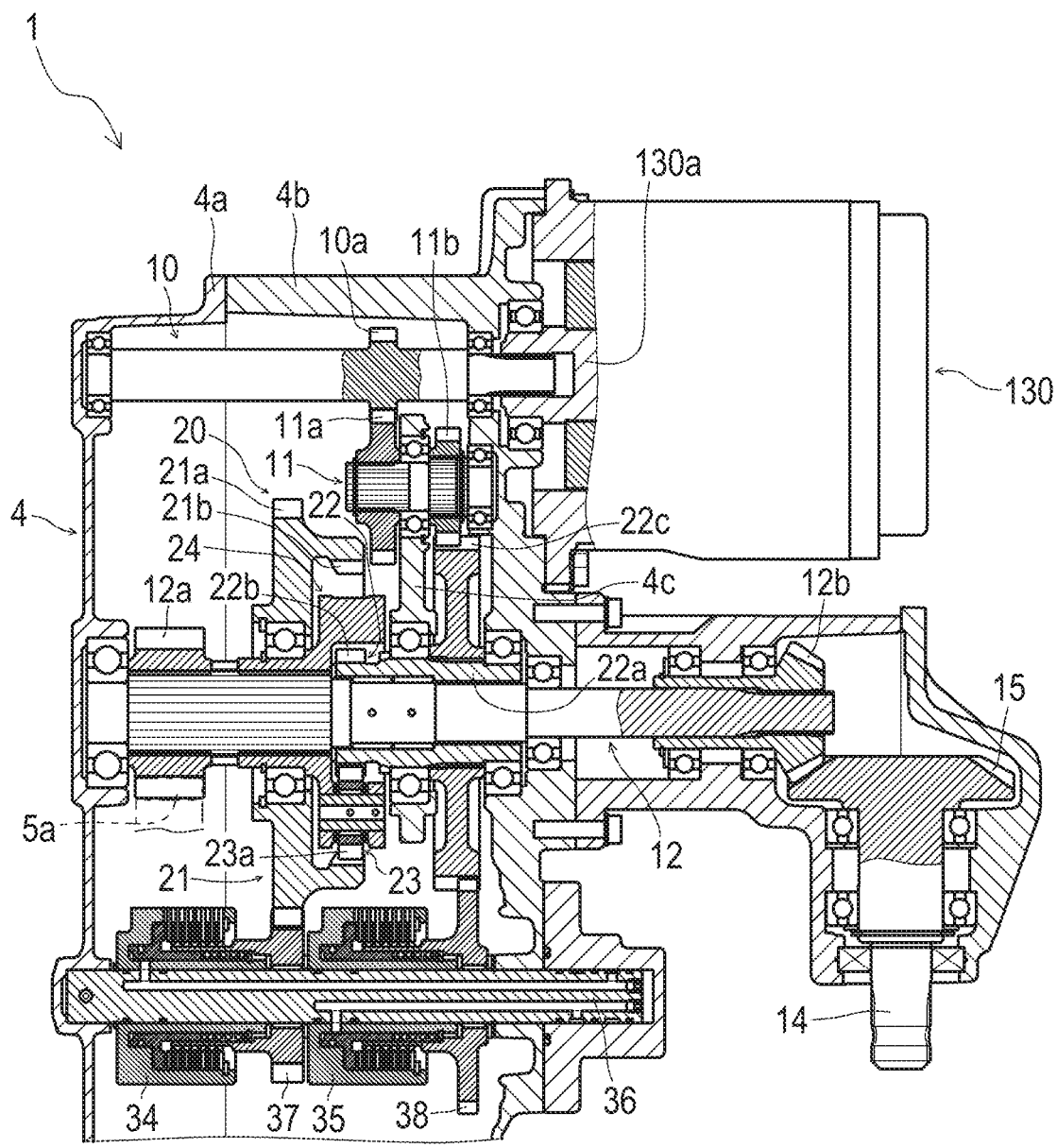
FIG. 9 is a detailed cross-sectional view illustrating the axle driving apparatus in the R-R cross section in FIG. 8A.

As illustrated in FIGS. 2 and 3, the axle driving apparatus 1 includes the engine-side input shaft 3, a transmission case 4, a differential gear mechanism 5, a pair of right and left rear-wheel driving shafts 6, 6, a motor-side input shaft 10, an output shaft 12, a PTO shaft 14 serving as a front-wheel driving shaft, a planetary gear mechanism 20, and the like. The differential gear mechanism 5, the output shaft 12, the planetary gear mechanism 20, and the like are accommodated in the transmission case 4.

Similarly to the internal combustion engine 120, the transmission case 4 is elastically supported (mounted in a vibration isolated manner) on the body frame 101 via a rubber vibration isolator. The power takeoff (hereinafter "PTO") shaft 14 for transmitting driving force to the front wheels 104, 104 projects forward from the transmission case 4, and the PTO shaft 14 is connected to the output shaft 12.

The transmission case 4 can be divided into a first case 4a and a second case 4b. The transmission case 4 includes a bearing plate 4c for supporting each shaft member accommodated in the transmission case 4.

As illustrated in FIG. 1, a battery 190 serving as a power source for driving an electric motor 130 (see FIG. 2) is disposed inside the front cover 101b of the UTV 100.

That is, in the UTV 100, the battery 190 is arranged not on the rear side but on the front side of the body frame 101.

In the UTV 100, heavy objects such as the axle driving apparatus 1 and the internal combustion engine 120 are arranged on the rear side of a body. However, by disposing the battery 190, which is a heavy object, on the front side of the body, uneven weight distribution in the front-rear direction of the UTV 100 is mitigated. For example, if the weight distribution in the front-rear direction of the UTV 100 is concentrated on the rear side, it becomes difficult to get out of a mud place when the rear wheel 105 gets caught in the mud place (when the rear wheel 105 gets stuck). However, by disposing the battery 190 on the front side of the body and thus mitigating uneven weight distribution in the front-rear direction in the UTV 100, it becomes easier to get out of a mud place.

As illustrated in FIG. 2, the pair of right and left rear-wheel driving shafts 6, 6 are connected by a differential gear mechanism 5 such that differential motion of the rear-wheel driving shafts 6, 6 is enabled. The rear wheel 105 is connected to the rear-wheel driving shaft 6 via a universal joint 107 and a transmission shaft 108.

As illustrated in FIGS. 1 and 2, a front case 50 is supported below the front cover 101b disposed at the front of the body frame 101. A pair of right and left front differential output shafts 51, 51 are supported on the front case 50. The front case 50 accommodates therein a differential gear mechanism 52 for connecting the pair of right and left front differential output shafts 51, 51 such that differential motion of the pair of right and left front differential output shafts 51, 51 is enabled. The axle of each of the front wheels 104, 104 is connected to the front differential output shaft 51 via a universal joint 109 and a transmission shaft 110.

The axles of the pair of right and left front wheels 104, 104 are connected by a tie rod 53, and the tie rod 53 is connected to the steering wheel 106 (see FIG. 1). With such a configuration, the pair of right and left front wheels 104 are turned to the right or the left via the tie rod 53 by the turning operation of the steering wheel 106, and thus the UTV 100 is steered. An input shaft 52a of the differential gear mechanism 52 projects horizontally rearward from the rear of the front case 50. The input shaft 52a and the PTO shaft 14 projecting from the transmission case 4 are connected via a transmission shaft 114 extending from the PTO shaft coaxially with the PTO shaft 14, a universal joint 111, a transmission shaft 112, and a universal joint 113.

In addition, the UTV 100 includes a pair of right and left traveling brakes 115, 116 as brakes for keep stopping the UTV 100. The traveling brakes 115, 116 are brakes that can fix the rear-wheel driving shafts 6, 6 in a non-rotatable manner, respectively. By depressing a brake pedal 117 illustrated in FIG. 1 so as to make the traveling brakes 115, 116 operate, it is possible to make the rear wheels 105, 105 unable to rotate.

Further, the traveling brakes 115, 116 move in conjunction with and are interlocked with a forward and backward movement switchover lever 118 illustrated in FIG. 1. The traveling brakes 115, 116 are configured to automatically operate when the forward and backward movement switchover lever 118 is switched to "N (neutral)", and also function as parking brakes which are brakes for keeping the UTV 100 parked.

As described above, the UTV 100, which is a hybrid vehicle according to the embodiment of the present invention, further includes the CVT 121 that is a continuously variable transmission provided between the internal combustion engine 120 and the engine-side input shaft 3. The CVT 121 changes speed of power of the internal combustion engine 120 and outputs the power to the engine-side input shaft. According to the above configuration, the speed change range can be widened in the mode of driving by the internal combustion engine 120.

Next, the configuration of the axle driving apparatus 1 according to the embodiment of the present invention will be described in more detail with reference to FIGS. 3 to 10.

The axle driving apparatus 1 illustrated in FIG. 3 is an axle driving apparatus for a hybrid vehicle according to the embodiment of the present invention, and is mounted on the UTV 100, which is a hybrid vehicle.

The axle driving apparatus 1 includes the engine-side input shaft 3 which is a first rotary shaft of the axle driving apparatus 1, the motor-side input shaft 10 which is a second rotary shaft, the output shaft 12 which is a third rotary shaft, and the planetary gear mechanism 20.

Here, the planetary gear mechanism 20 will be described.

As illustrated in FIGS. 3 to 10, the planetary gear mechanism 20 is an interlocking unit for interlocking the engine-side input shaft 3, the motor-side input shaft 10, and the output shaft 12 such that power can be transmitted from one another. The planetary gear mechanism 20 includes an internal gear 21, a sun gear 22, a plurality of planetary gears 23, 23 . . . , and a planetary carrier 24.

In the internal gear 21, an outer transmission gear 21a is formed along the outer circumference, and an inner transmission gear 21b is formed along the inner circumference.

The sun gear 22 includes a cylindrical shaft portion 22a, a first transmission gear 22b formed at one end portion of the shaft portion 22a, and a second transmission gear 22c formed at the other end portion of the shaft portion 22a.

In the sun gear 22, the output shaft 12 is inserted into the shaft portion 22a with a bearing interposed between the shaft portion 22a and the output shaft 12. The sun gear 22 is configured to be rotatable coaxially with the output shaft 12.

The first transmission gear 22b of the sun gear 22 meshes with the inner transmission gear 21b of the internal gear 21 and the plurality of planetary gears 23, 23, . . . . In addition, the second transmission gear 22c of the sun gear 22 meshes with a second transmission gear 11b of an intermediate shaft 11.

The plurality of planetary gears 23, 23, . . . is radially disposed at equal intervals about the axis of the output shaft 12 on the outer circumferential portion of the planetary carrier 24, and is supported by the planetary carrier 24 so as to freely rotate and revolve.

The plurality of planetary gears 23, 23, . . . meshes with the inner transmission gear 21b of the internal gear 21, and meshes with the first transmission gear 22b of the sun gear 22. With such a configuration, when at least one of the internal gear 21 and the sun gear 22 rotates about the output shaft 12, the plurality of planetary gears 23, 23, . . . is shifted about the output shaft 12 according to the rotation condition of at least one of the internal gear 21 and the sun gear 22, and the shift of the plurality of planetary gears 23, 23, . . . is output as rotary force to the output shaft 12 by the planetary carrier 24.

The engine-side input shaft 3 is a shaft for inputting power of the internal combustion engine 120 to the axle driving apparatus 1. The output pulley 123 of the CVT 121 is fixed to one end portion of engine-side input shaft 3 via a clutch 33 to be described later and a transmission gear 3a is formed at the other end portion of the engine-side input shaft 3. In the engine-side input shaft 3, the transmission gear 3a meshes with the outer transmission gear 21a of the internal gear 21. Thus, the engine-side input shaft 3 is interlocked with the planetary gear mechanism 20.

The motor-side input shaft 10 is a shaft for inputting power of the electric motor 130 to the axle driving apparatus 1. A rotary shaft 130a of the electric motor 130 is connected to one end portion of motor-side input shaft 10 and a transmission gear 10a is formed at the other end portion of the motor-side input shaft 10.

In the axle driving apparatus 1, the intermediate shaft 11 is disposed between the motor-side input shaft 10 and the planetary gear mechanism 20.

A first transmission gear 11a is formed at one end portion of the intermediate shaft 11 and a second transmission gear 11b formed at the other end portion of the intermediate shaft 11. The first transmission gear 11a of the intermediate shaft 11 meshes with the transmission gear 10a of the motor-side input shaft 10. In the motor-side input shaft 10, the transmission gear 10a meshes with the first transmission gear 11a of the intermediate shaft 11. In the intermediate shaft 11, the second transmission gear 11b meshes with the second transmission gear 22c formed integrally with the sun gear 22. With such a configuration, power output from the electric motor 130 is transmitted to the sun gear 22 via the motor-side input shaft 10 and the intermediate shaft 11. In other words, in the axle driving apparatus 1, the motor-side input shaft 10 is configured to be able to be interlocked with the planetary gear mechanism 20.

Note that in a case where the electric motor 130 functions as a generator (power generator), the motor-side input shaft 10 functions as an output shaft for outputting power output from the internal combustion engine 120 to the electric motor 130.

Note that as the electric motor 130 used in the axle driving apparatus 1, it is possible to adopt various kinds of motors such as a SR (Switched Reluctance) motor, an AC motor, a DC motor, a PM (Permanent Magnet) motor. The type, capacity, and the like of the motor are appropriately selected according to the type, intended use, desired performance, or the like of the UTV 100.

The output shaft 12 is a shaft for outputting power, which has been input to the planetary gear mechanism 20 from at least one of the internal combustion engine 120 and the electric motor 130, to the rear-wheel driving shafts 6, 6 and the PTO shaft 14 serving as a front-wheel driving shaft. A transmission gear 12*a* is formed at one end portion of the output shaft 12 and a bevel gear 12*b* is formed at the other end portion of the output shaft 12. The transmission gear 12*a* meshes with a ring gear 5*b* provided on a differential case 5*a* of the differential gear mechanism 5. Power transmitted to the output shaft 12 via the differential gear mechanism 5 is output to the rear-wheel driving shafts 6, 6 and the PTO shaft 14.

Figure 10:
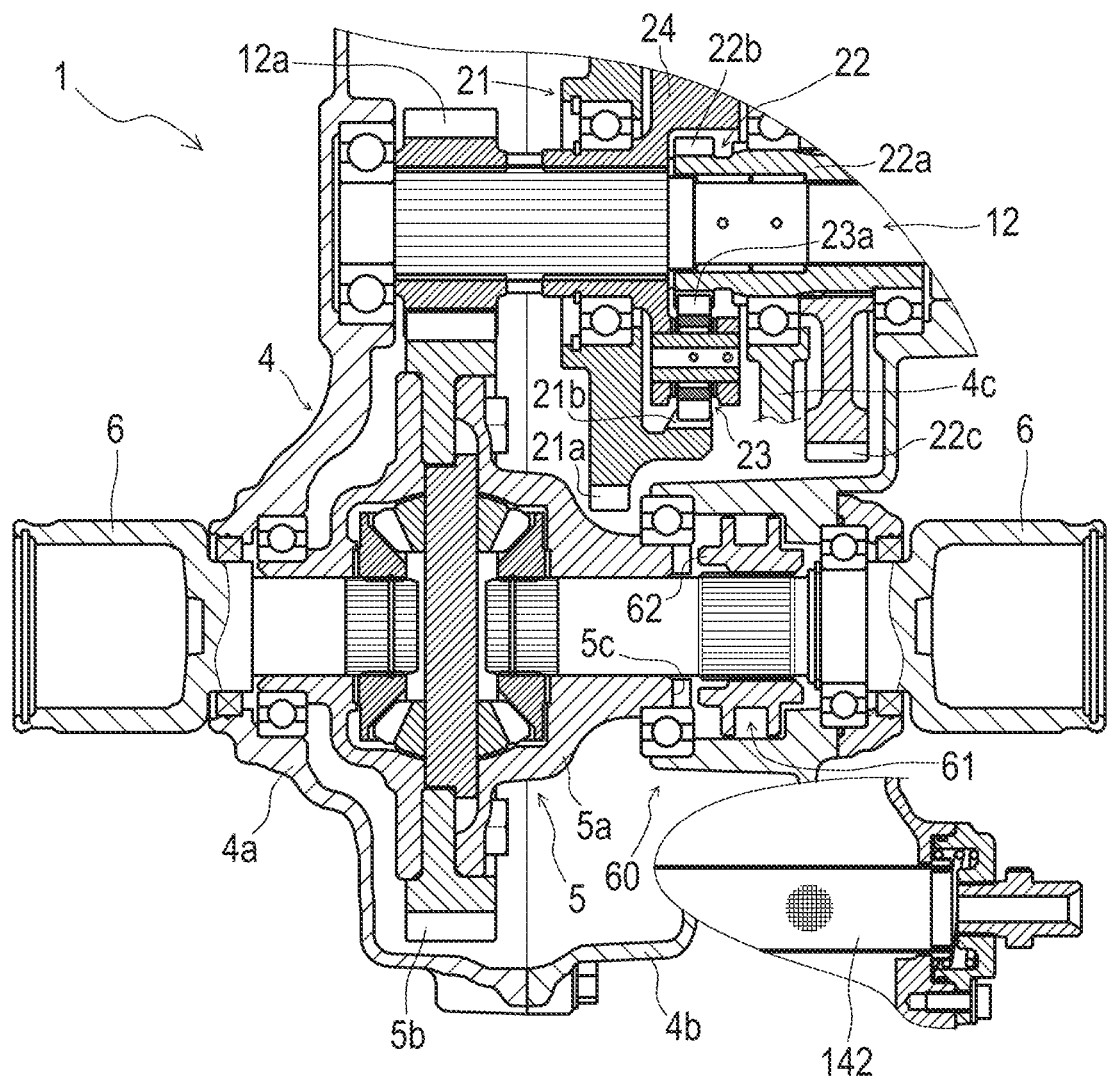
FIG. 10 is a detailed cross-sectional view illustrating the axle driving apparatus in the S-S cross section in FIG. 8B.

Note that as illustrated in FIG. 10, the differential gear mechanism 5 includes a differential lock mechanism 60. The differential lock mechanism 60 is a mechanism that switches the pair of right and left rear-wheel driving shafts 6, 6 between a state where the pair of right and left rear-wheel driving shafts 6, 6 can move differentially and a state where the pair of right and left rear-wheel driving shafts 6, 6 cannot move differentially. The differential lock mechanism 60 is configured of a differential lock slider 61 and the like.

The differential lock slider 61 is provided on the right rear-wheel driving shaft 6 in FIG. 10 so as to be shiftable in the axial direction of the right rear-wheel driving shaft 6. The differential lock slider 61 has a projection 62 formed at an end portion on a side facing the differential case 5*a*. A recess 5*c* into which the projection 62 can be inserted is formed at a portion of the differential case 5*a* which faces the projection 62.

In the differential lock mechanism 60, a piston, not illustrated, shifts the differential lock slider 61 to a position where the projection 62 is inserted in the recess 5*c* (differential lock position) and therefore, the right rear-wheel driving shaft 6 can be fixed to the differential case 5*a*. As a result, the rear-wheel driving shafts 6, 6 cannot move differentially. In addition, in the differential lock mechanism 60, the piston, not illustrated, shifts the differential lock slider 61 to a position where the projection 62 is not inserted in the recess 5*c* (differential lock release position illustrated in FIG. 10). As a result, the rear-wheel driving shafts 6, 6 can move differentially.

The planetary carrier 24 is fixed to a middle portion of the output shaft 12 between the transmission gear 12*a* and the bevel gear 12*b*. Thus, the output shaft 12 is interlocked with the planetary gear mechanism 20.

As described above, in the axle driving apparatus 1, the engine-side input shaft 3, the motor-side input shaft 10, and the output shaft 12 are interlocked with one another by the planetary gear mechanism 20 such that power can be transmitted to one another.

The bevel gear 12*b* is fixed to the other end portion of the output shaft 12. The bevel gear 12*b* meshes with a bevel gear 15 disposed at a rear end portion of the PTO shaft 14. After the direction of power output from the output shaft 12 is changed by 90 degrees by the bevel gear 12*b* and the bevel gear 15, the power is transmitted to the PTO shaft 14.

Note that in the present embodiment, the planetary gear mechanism 20 is employed as an interlocking unit which interlocks the engine-side input shaft 3, the motor-side input shaft 10, and the output shaft 12. However, the configuration of the interlocking unit is not limited thereto, and it is possible to adopt an interlocking unit having another configuration. For example, the interlocking unit may have a configuration where a plurality of clutches are provided and an input and output system of power is switched over by engaging or disengaging the plurality of clutches.

Here, an input and output switchover unit 30 will be described.

Figures 11A, 11B:
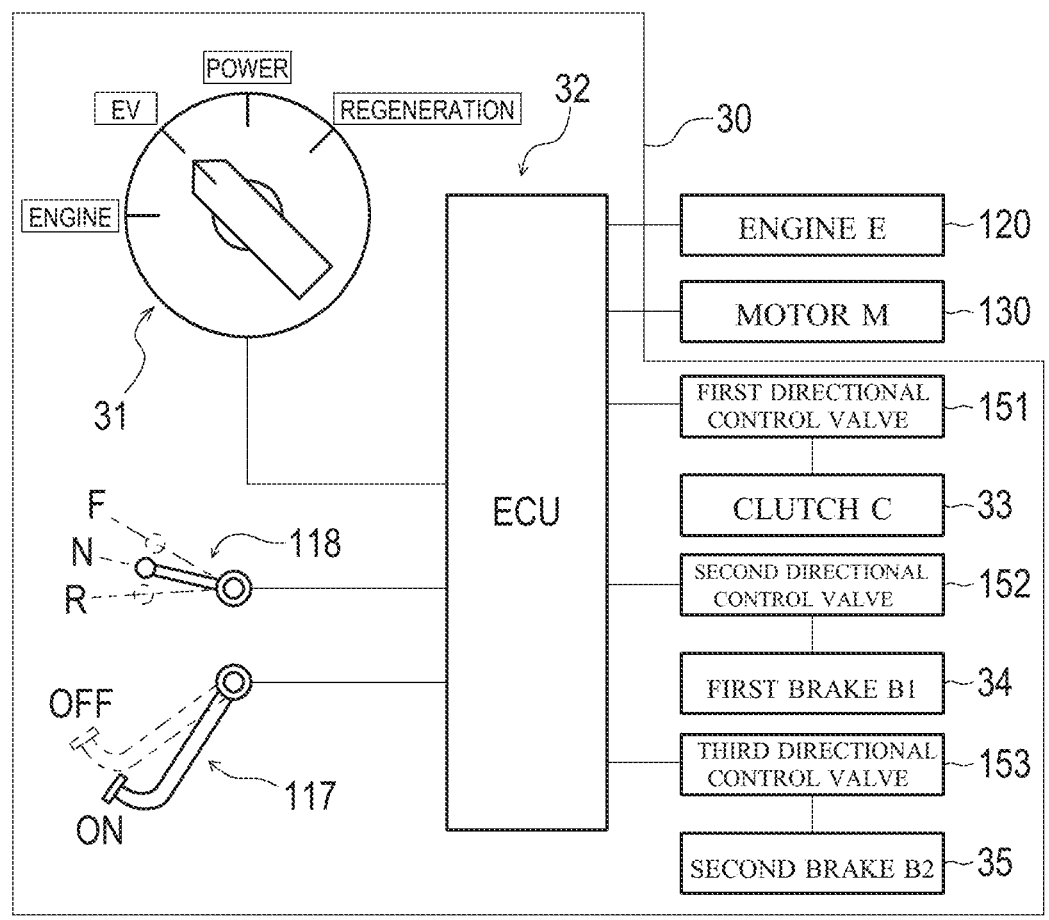
FIGS. 11A and 11B are explanatory diagrams of a driving mode switchover unit in the axle driving apparatus for a hybrid vehicle according to the embodiment of the present invention.

As illustrated in FIG. 11A, the axle driving apparatus 1 includes an input and output switchover unit 30 which is a unit for switching over the input and output system. The input and output switchover unit 30 includes an operation unit 31, an ECU 32, and a clutch 33, a first brake 34, and a second brake 35 serving as output units.

The operation unit 31 is disposed on a dashboard near the steering wheel 106 and is a section that a driver of the UTV 100 artificially operates in order to switch over the driving mode. The operation unit 31 illustrated in the present embodiment has a mode of a select switch configured such that the driver can switch over the driving mode by turning a knob.

The ECU 32 is a device that outputs a command signal to each unit serving as an output unit according to the operation of the operation unit 31. In addition to the output units of the input and output switchover unit 30, the internal combustion engine 120 and the electric motor 130 are also connected to the ECU 32. In response to the operation of the operation unit 31, the ECU 32 directly outputs driving signals to the internal combustion engine 120 and the electric motor 130.

As illustrated in FIGS. 3 to 10, the clutch 33 is a mechanism for engaging and disengaging power transmission from the internal combustion engine 120 to the engine-side input shaft 3. The clutch 33 is disposed at a middle portion of the engine-side input shaft 3 (section between the output pulley 123 and a transmission gear 3*a*), and is configured to be engaged and disengaged according to output from the ECU 32. That is, the clutch 33 can transmit and shut off power of the internal combustion engine 120 input from the output pulley 123 to the engine-side input shaft 3, on the engine-side input shaft 3.

The clutch 33 is a hydraulic clutch, and includes a first member 33*a* and a second member 33*b* each including a friction plate.

When the clutch 33 is "engaged", the first member 33*a* and the second member 33*b* are engaged with each other by hydraulic pressure. Thus, the transmission gear 3*a* is integrated on the engine-side input shaft 3 and the clutch 33 is brought into a state capable of transmitting power. Note that in the present embodiment, a hydraulic clutch is adopted as the clutch 33; however, a clutch having another structure such as an electromagnetic clutch may be adopted.

The first brake 34 is a section for fixing the internal gear 21 of the planetary gear mechanism 20. As illustrated in FIG. 11A, the first brake 34 is configured to be turned on and off according to output from the ECU 32.

In addition, as illustrated in FIGS. 3 to 10, the second brake 35 is a section for fixing the sun gear 22 of the planetary gear mechanism 20. As illustrated in FIG. 11A, the second brake 35 is configured to be turned on and off according to output from the ECU 32.

Here, a configuration of a hydraulic circuit that operates the clutch 33 and the first and second brakes 34, 35 will be described with reference to FIG. 12.

Figure 12:
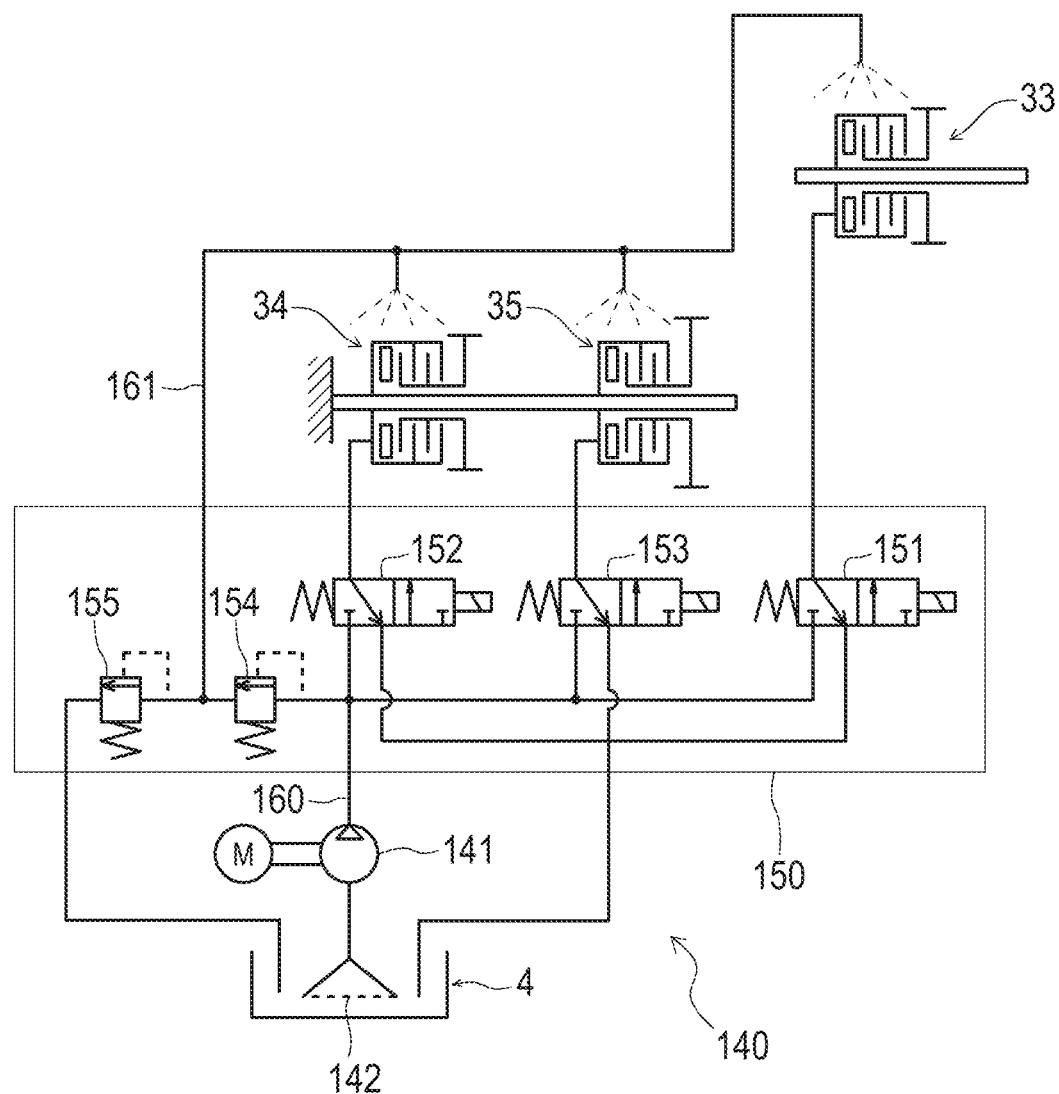
FIG. 12 is a schematic diagram illustrating a hydraulic circuit in a UTV including the axle driving apparatus according to the embodiment of the present invention.

As illustrated in FIG. 12, the UTV 100 (see FIG. 1) including the axle driving apparatus 1 includes a hydraulic unit 140 for supplying hydraulic fluid for the clutch 33 and the first and second brakes 34, 35. The hydraulic unit 140 includes an electric hydraulic pump 141 and a valve unit 150 for switching over the supply state of the hydraulic fluid. The electric hydraulic pump 141 and the valve unit 150 are connected to each other via an oil passage 160 configured of a drilled hole, a pipe, and the like.

The hydraulic unit 140 is disposed in the body frame 101 near the transmission case 4. The electric hydraulic pump 141 sucks hydraulic fluid stored in a lower part (an oil pan) of the transmission case 4 through an oil filter 142, and supplies the hydraulic fluid to the valve unit 150 via the oil passage 160.

The valve unit 150 is configured of a plurality of directional control valves 151, 152, 153 and a plurality of relief valves 154, 155. A first relief valve 154 for setting the pressure of hydraulic fluid to be supplied to the clutch 33 is provided on the oil passage 160 at the primary side of the valve unit 150. A second relief valve 155 for setting the pressure of lubricating oil to be supplied to the clutch 33 and the brakes 34, 35 is provided on the oil passage 160 at the secondary side of the first relief valve 154. A lubricating oil passage 161 between the first relief valve 154 and the second relief valve 155 is connected to the oil passage 160. The hydraulic fluid is supplied as the lubricating oil to the clutch 33 and the first and second brakes 34, 35 through the lubricating oil passage 161. The pressure of the hydraulic fluid in the lubricating oil passage 161 is kept constant by the second relief valve 155. Thus, a fixed amount of lubricating oil is constantly supplied to the clutch 33 and the first and second brakes 34, 35.

A directional control valve 151 (hereinafter referred to as a first directional control valve 151) is a normally-closed directional control valve having three ports for switching over supply of the hydraulic fluid to the clutch 33. According to a command signal from the ECU 32, the first directional control valve 151 is turned "ON (state where a solenoid is energized)" and is capable of supplying the hydraulic fluid at predetermined pressure to the clutch 33. In addition, according to a command signal from the ECU 32, the first directional control valve 151 is turned "OFF (state where the solenoid is not energized)" and is capable of shutting off supply of the hydraulic fluid to the clutch 33.

A directional control valve 152 (hereinafter referred to as a second directional control valve 152) is a normally-closed directional control valve having three ports for switching over supply of the hydraulic fluid to the first brake 34. According to a command signal from the ECU 32, the second directional control valve 152 is turned "ON (state where a solenoid is energized)" and is capable of supplying the hydraulic fluid at predetermined pressure to the first brake 34. In addition, according to a command signal from the ECU 32, the second directional control valve 152 is turned "OFF (state where the solenoid is not energized)" and is capable of shutting off supply of the hydraulic fluid to the first brake 34.

A directional control valve 153 (hereinafter referred to as a third directional control valve 153) is a normally-closed directional control valve having three ports for switching over supply of the hydraulic fluid to the second brake 35. According to a command signal from the ECU 32, the third directional control valve 153 is turned "ON (state where a solenoid is energized)" and is capable of supplying the hydraulic fluid at predetermined pressure to the second brake 35. In addition, according to a command signal from the ECU 32, the third directional control valve 153 is turned "OFF (state where the solenoid is not energized)" and is capable of shutting off supply of the hydraulic fluid to the second brake 35.

As illustrated in FIGS. 3 to 10, the input and output switchover unit 30 further includes a support shaft 36 installed in a non-rotatable manner in the transmission case 4, a first brake gear 37, and a second brake gear 38.

The first brake gear 37 is rotatably supported on the support shaft 36 and meshes with the outer transmission gear 21a of the internal gear 21. The first brake 34 is a hydraulic brake unit that can fix the first brake gear 37 in a non-rotatable manner. By "turning on" the first brake 34, the outer transmission gear 21a meshing with the first brake gear 37 can be made non-rotatable with a friction plate interposed therebetween, and thus the internal gear 21 can be fixed. By "turning off" the first brake 34, the outer transmission gear 21a meshing with the first brake gear 37 can be made rotatable.

The second brake gear 38 is rotatably supported on the support shaft 36 and meshes with the second transmission gear 22c configured integrally with the sun gear 22. The second brake 35 is a hydraulic brake unit that can fix the second brake gear 38 in a non-rotatable manner. By "turning on" the second brake 35, the second transmission gear 22c meshing with the second brake gear 38 can be made non-rotatable, and thus the sun gear 22 can be fixed. By "turning off" the second brake 35, the second transmission gear 22c meshing with the second brake gear 38 can be made rotatable with a friction plate interposed therebetween, and thus the sun gear 22 can be made rotatable. Note that in the present embodiment, a case where each of the first brake 34 and the second brake 35 is configured of a hydraulic brake has been described as an example; however, each of the first brake 34 and the second brake 35 may be configured of an electromagnetic brake.

As illustrated in FIG. 3, in the planetary gear mechanism 20, in a case where the internal gear 21 is fixed, power of the internal combustion engine 120 is not transmitted, and only power of the electric motor 130 is input to the planetary gear mechanism 20. In this case, in the axle driving apparatus 1, power of the electric motor 130 is input to the sun gear 22, and only power of the electric motor 130 is output from the planetary carrier 24.

In the planetary gear mechanism 20, in a case where the sun gear 22 is fixed, power of the electric motor 130 is not transmitted, and only power of the internal combustion engine 120 is input to the planetary gear mechanism 20. In this case, in the axle driving apparatus 1, power of the internal combustion engine 120 is input to the internal gear 21, and only power of the internal combustion engine 120 is output from the planetary carrier 24.

In the planetary gear mechanism 20, in a case to be described later where the planetary carrier 24 is fixed and the internal gear 21 and the sun gear 22 are rotatable, power transmission to the output shaft 12 is shut off, power of the internal combustion engine 120 is output from the sun gear 22, and power is transmitted from the motor-side input shaft 10 to the electric motor 130 functioning as a generator.

Figure 13:
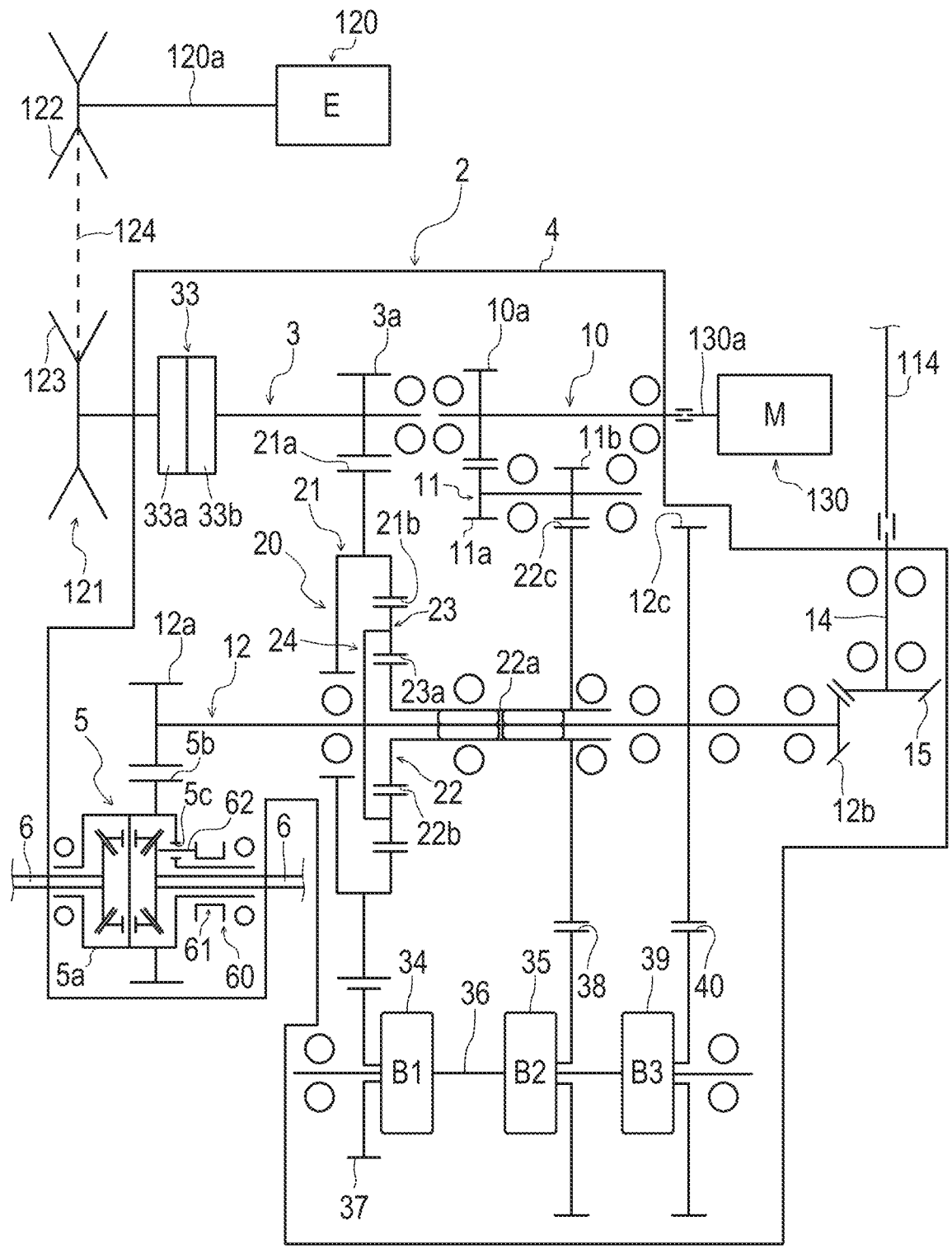
FIG. 13 is a schematic diagram illustrating the entire configuration of an axle driving apparatus according to another embodiment of the present invention.

Note that in the UTV 100, an axle driving apparatus 2 according to another embodiment as illustrated in FIG. 13 may be adopted. The axle driving apparatus 2 includes a third brake 39 and a third brake gear 40 for fixing an output shaft 12. The output shaft 12 (that is, a planetary carrier 24) may be fixed not by traveling brakes 115, 116 also functioning as parking brakes but by the third brake 39. In this case, the axle driving apparatus 2 has a configuration where a brake gear 12c meshing with the third brake gear 40 is disposed on the output shaft 12.

The third brake gear 40 is rotatably supported on the support shaft 36 and meshes with the brake gear 12c of the output shaft 12 configured integrally with the planetary carrier 24. The third brake 39 is a hydraulic brake unit that can fix the third brake gear 40 in a non-rotatable manner. By "turning on" the third brake 39, the brake gear 12c meshing with the third brake gear 40 can be made non-rotatable with a friction plate interposed therebetween, and thus the output shaft 12 can be fixed. By "turning off" the third brake 39, the brake gear 12c meshing with the third brake gear 40 can be made rotatable, and thus the output shaft 12 can be made rotatable.

That is, the interlocking unit in the axle driving apparatus 1 according to the embodiment of the present invention is configured as the planetary gear mechanism 20 including: the internal gear 21 which is interlocked with the engine-side input shaft 3; the sun gear 22 which is interlocked with the motor-side input shaft 10; the plurality of planetary gears 23, 23, . . . which meshes with the internal gear 21 and the sun gear 22; and the planetary carrier 24 which supports the plurality of planetary gears 23, 23, . . . and is interlocked with the output shaft 12. The input and output switchover unit 30 includes the clutch 33, the first brake 34, and the second brake 35. The clutch 33 is provided on the engine-side input shaft 3 and can engage and disengage power transmission from the internal combustion engine 120. The first brake 34 can fix the internal gear 21 and can thereby fix the engine-side input shaft 3 in a non-rotatable manner by fixing the internal gear 21. The second brake 35 can fix the sun gear 22 and can thereby fix the motor-side input shaft 10 by fixing the sun gear 22. The clutch 33 can be engaged and disengaged and the first brake 34 and the second brake 35 can be turned on and off, independently from one another.

According to such a configuration, it is possible to easily change the driving mode of the UTV 100.

Next, respective driving modes in the UTV 100 including the axle driving apparatus 1 will be described with reference to FIGS. 11A, 11B, and 14 to 18.

The axle driving apparatus 1 includes the input and output switchover unit 30, and the operation unit 31 for mode switchover as illustrated in FIG. 11A is disposed near the driver's seat 102 (see FIG. 1) of the UTV 100. The operation unit 31 which is a knob-shaped select switch is connected to the ECU (electronic control unit) 32. When the driver changes the turned position of the operation unit 31 and selects a driving mode, a command signal indicating that the driving mode is selected is input to the ECU 32. Note that in the present embodiment, the operation unit 31 having a knob-like shape is described as an example; however, the configuration of the operation unit 31 is not limited to this.

The ECU 32 is connected to the internal combustion engine 120, the electric motor 130, the clutch 33, the first brake 34, and the second brake 35. According to the selected driving mode, a signal is transmitted from the ECU 32 to the internal combustion engine 120, the electric motor 130, the clutch 33, the first brake 34, and the second brake 35 so as to switch over the internal combustion engine 120, the electric motor 130, the clutch 33, the first brake 34, and the second brake 35 between ON and OFF.

The UTV 100 including the axle driving apparatus 1 is configured such that the driving mode is switched over among five operation modes, "ENGINE mode, EV mode, POWER mode, REGENERATION mode, and EV mode during reversing" as illustrated in FIG. 11B. The ECU 32 stores in advance information (information illustrated in FIG. 11B) indicating whether each of the internal combustion engine 120, the electric motor 130, the clutch 33, the first brake 34, and the second brake 35 is ON or OFF in each driving mode.

First, the ENGINE mode, which is a first mode, will be described with reference to FIGS. 11A, 14A, and 14B.

In the UTV 100, when the forward and backward movement switchover lever 118 illustrated in FIG. 11A is switched to "F (forward)" and the brake pedal 117 is not depressed (that is, the traveling brakes 115, 116 serving as parking brakes are "OFF"), the driver artificially turns the operation unit 31 to the "ENGINE" position, and thereby the driving mode is switched to the ENGINE mode.

The ENGINE mode is a travel mode in which all the wheels (the front wheels 104, 104 and the rear wheels 105, 105 (see FIG. 1)) are driven by power of the internal combustion engine 120. In the ENGINE mode, for example, even in a case where the electric motor 130 fails or the battery 190 (see FIG. 1) is used up and therefore traveling by using the electric motor 130 becomes impossible, the UTV 100 can travel.

Figures 14A, 14B:
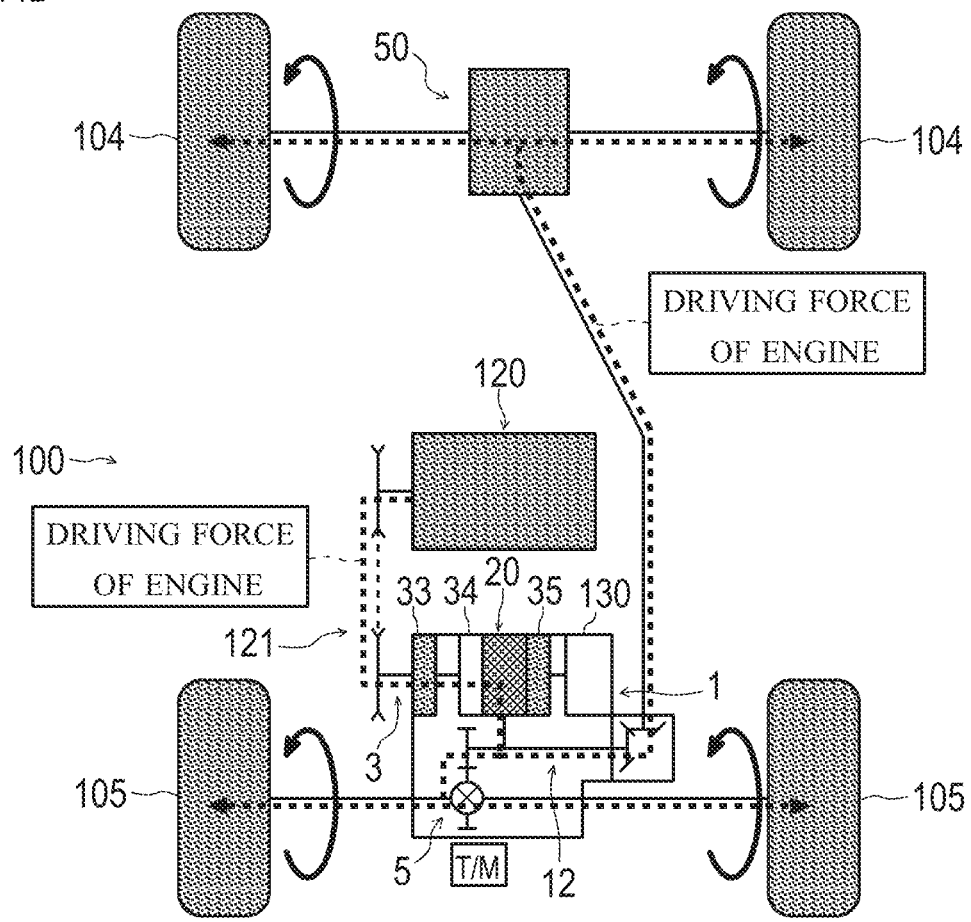
FIGS. 14A and 14B are explanatory diagrams of an ENGINE mode in the UTV including the axle driving apparatus for a hybrid vehicle.

In a case where the ENGINE mode is selected by the operation unit 31, according to a signal output from the ECU 32, the internal combustion engine 120 is "turned on (ON)", the electric motor 130 is turned "off (OFF)", the clutch 33 is "engaged", the first brake 34 is "turned off", and the second brake 35 is "turned on", as illustrated in FIGS. 14A and 14B. Note that "turned on" and "ON" have the same meaning, and "turned off" and "OFF" have the same meaning.

In a case where the ENGINE mode is selected, in the UTV 100, the front wheels 104, 104 and the rear wheels 105, 105 are driven by using only the internal combustion engine 120 as a drive source, as illustrated in FIG. 14B.

That is, in the axle driving apparatus 1 according to the embodiment of the present invention, the input and output switchover unit 30 enables the ENGINE mode to be selected in which the clutch 33 is "engaged", the first brake 34 is "turned off", the second brake 35 is "turned on" and only power of the internal combustion engine 120 is output from the output shaft 12, which is the third rotary shaft. Thus, the UTV 100 can travel only by power of the internal combustion engine 120.

Next, the EV mode, which is a second mode, will be described with reference to FIGS. 11A, 15A, and 15B.

In the UTV 100, when the forward and backward movement switchover lever 118 illustrated in FIG. 11A is switched to "F (forward)" and the brake pedal 117 is not depressed (that is, the traveling brakes 115, 116 serving as parking brakes are "OFF"), the driver artificially turns the operation unit 31 to the "EV" position, and thereby the driving mode is switched to the EV mode.

The EV (Electric Vehicle) mode is a travel mode in which the UTV 100 only functions as an electric vehicle. The front wheels 104, 104 and the rear wheels 105, 105 (see FIG. 1) are driven only by the electric motor 130. Thus, the UTV 100 can travel quietly. The EV mode is particularly suitable for use in a case of hunting and the like, such as a case where a hunter slowly and quietly moves to a location where game exists while getting on the UTV 100.

Figures 15A, 15B:
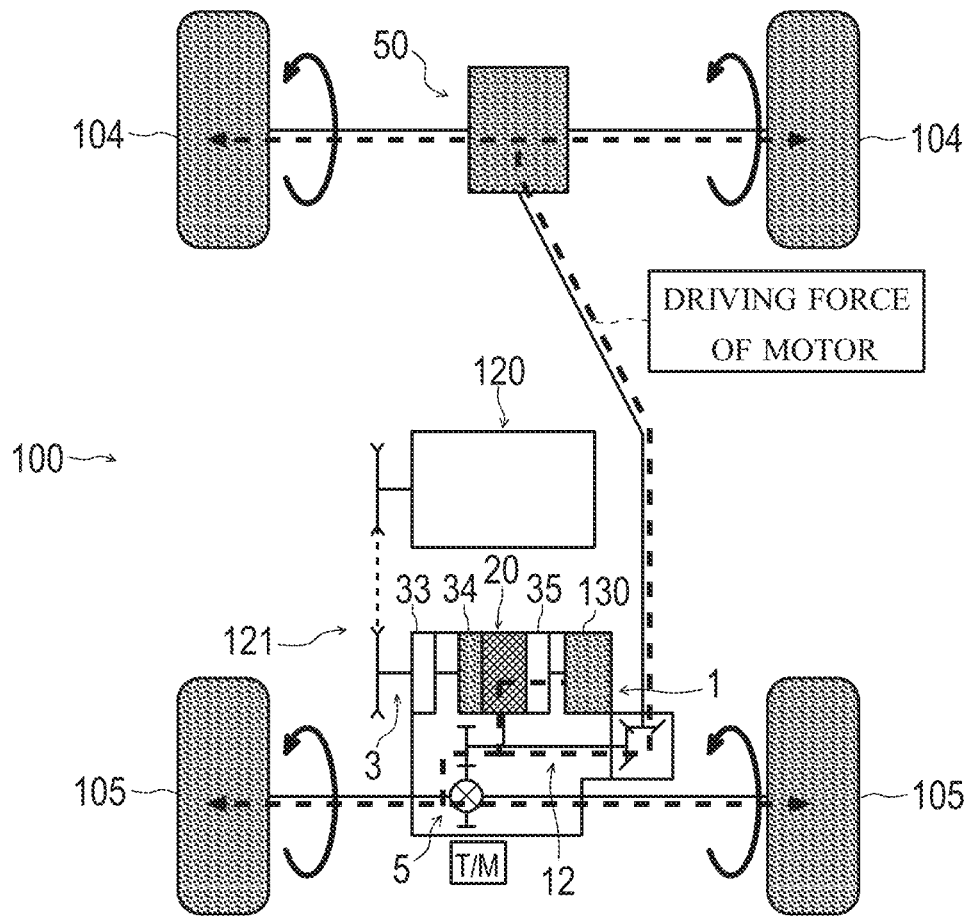
FIGS. 15A and 15B are explanatory diagrams of an EV mode in the UTV including the axle driving apparatus for a hybrid vehicle.

In a case where the EV mode is selected by the operation unit 31, according to a signal output from the ECU 32, the internal combustion engine 120 is "turned off", the electric motor 130 is "turned on", the clutch 33 is "disengaged", the first brake 34 is "turned on", and the second brake 35 is "turned off", as illustrated in FIGS. 15A and 15B.

In a case where the EV mode is selected, as illustrated in FIG. 15B, in the UTV 100, the front wheels 104, 104 and the rear wheels 105, 105 are driven by using only the electric motor 130 as a drive source.

In a case where the EV mode is selected in the UTV 100, the internal combustion engine 120 is stopped. Therefore, high quietness can be achieved. In addition, in the EV mode, the UTV 100 can travel only as an electric vehicle without using the internal combustion engine 120. Even if there is no fuel, the UTV 100 can travel for a certain period of time. Therefore, fuel consumption of the internal combustion engine 120 can be reduced.

That is, in the axle driving apparatus 1 according to the embodiment of the present invention, the input and output switchover unit 30 enables the EV mode to be selected in which the clutch 33 is "disengaged", the first brake 34 is "turned on", the second brake 35 is "turned off" and only power of the electric motor 130 is output from the output shaft 12. Thus, the UTV 100 can travel only by power of the electric motor 130.

Next, the POWER mode, which is a third mode, will be described with reference to FIGS. 11A, 16A, and 16B.

In the UTV 100, when the forward and backward movement switchover lever 118 illustrated in FIG. 11A is switched to "F (forward)" and the brake pedal 117 is not depressed (that is, the traveling brakes 115, 116 serving as parking brakes are "OFF"), the driver artificially turns the operation unit 31 to the "POWER" position, and thereby the driving mode is switched to the POWER mode.

The POWER mode is a mode for assisting the driving force of the internal combustion engine 120 with the electric motor 130. In the POWER mode, it is possible to obtain higher driving force (traction force) and acceleration force, and is also possible to prevent a slow start occurring in a case of using the CVT 121 (see FIG. 1).

Figures 16A, 16B:
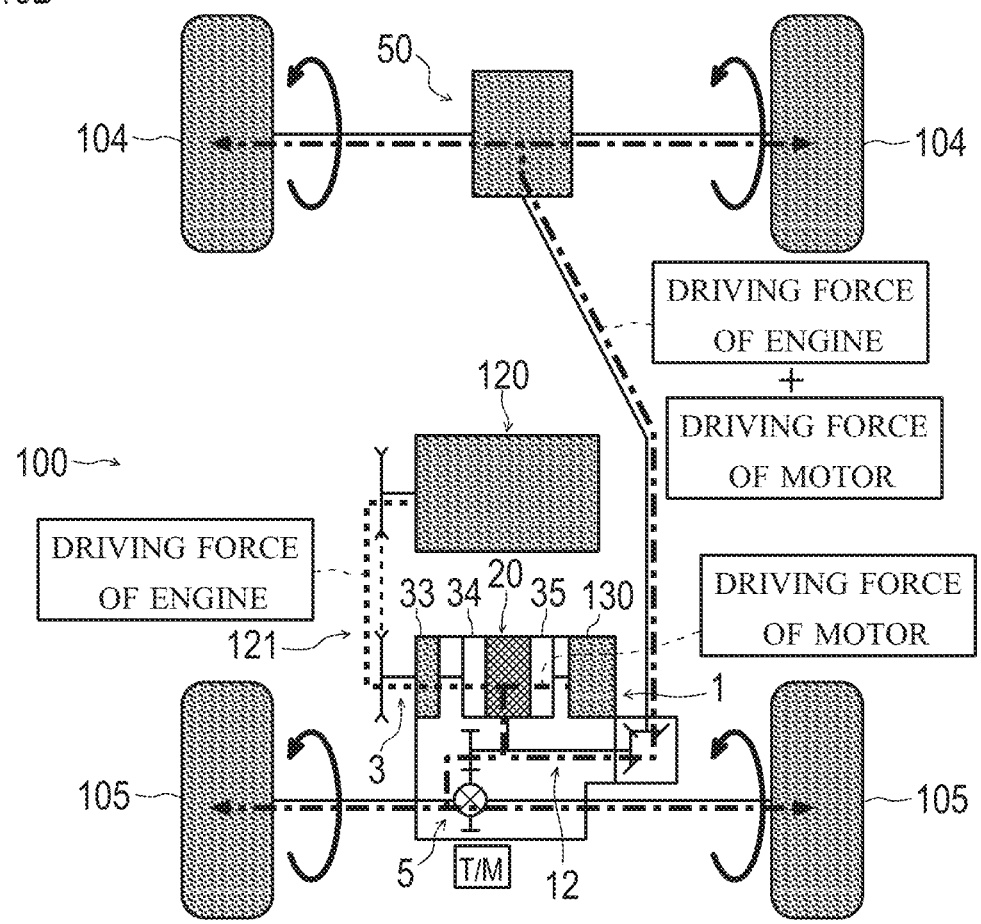
FIGS. 16A and 16B are explanatory diagrams of a POWER mode in the UTV including the axle driving apparatus for a hybrid vehicle.

In a case where the POWER mode is selected by the operation unit 31, according to a signal output from the ECU 32, the internal combustion engine 120 and the electric motor 130 are "turned on", the clutch 33 is "engaged", the first brake 34 is "turned off", and the second brake 35 is "turned off", as illustrated in FIGS. 16A and 16B. In such a switching state, power of the internal combustion engine 120 and power of the electric motor 130 are input to the planetary gear mechanism 20. The power of the internal combustion engine 120 and the power of the electric motor 130 are combined and output from the planetary carrier 24 to the output shaft 12 (see FIG. 3).

In addition, in the case of using the belt-type CVT 121 (see FIG. 1), it is impossible to obtain sufficient driving force for starting unless the rotation speed of the internal combustion engine 120 is increased to a certain value or more. However, in the axle driving apparatus 1, by assisting the internal combustion engine 120 with the electric motor 130, it is possible to obtain sufficient driving force for starting even when the internal combustion engine 120 rotates at a low speed. Therefore, it is possible to prevent a slow start of the UTV 100.

That is, in the axle driving apparatus 1 according to the embodiment of the present invention, the input and output switchover unit 30 enables the POWER mode to be selected in which the clutch 33 is "engaged", the first brake 34 is "turned off", the second brake 35 is "turned off", and power of the internal combustion engine 120 and power of the electric motor 130 are combined by the planetary gear mechanism 20 and the combined power is output from the output shaft 12. Thus, the UTV 100 can travel by combining the power of the internal combustion engine 120 and the power of the electric motor 130.

Next, the REGENERATION mode, which is a fourth mode, will be described with reference to FIGS. 11A, 17A, and 17B.

In the UTV 100, when the forward and backward movement switchover lever 118 illustrated in FIG. 11A is switched to "N (neutral)" and the brake pedal 117 is depressed (that is, the traveling brakes 115, 116 serving as parking brakes are "ON"), the driver artificially turns the operation unit 31 to the "REGENERATION" position, and thereby the driving mode is switched to the REGENERATION mode.

The REGENERATION mode is a mode in which the electric motor 130 is used as a power generator to convert output of the internal combustion engine 120 into electric energy to charge the battery 190 (see FIG. 1). The REGENERATION mode is executed in a state where the UTV 100 is stopped and the traveling brakes 115, 116 (see FIG. 17A) are "turned on", that is, in a state where the output shaft 12 and the planetary carrier 24 are made non-rotatable.

Figures 17A, 17B:
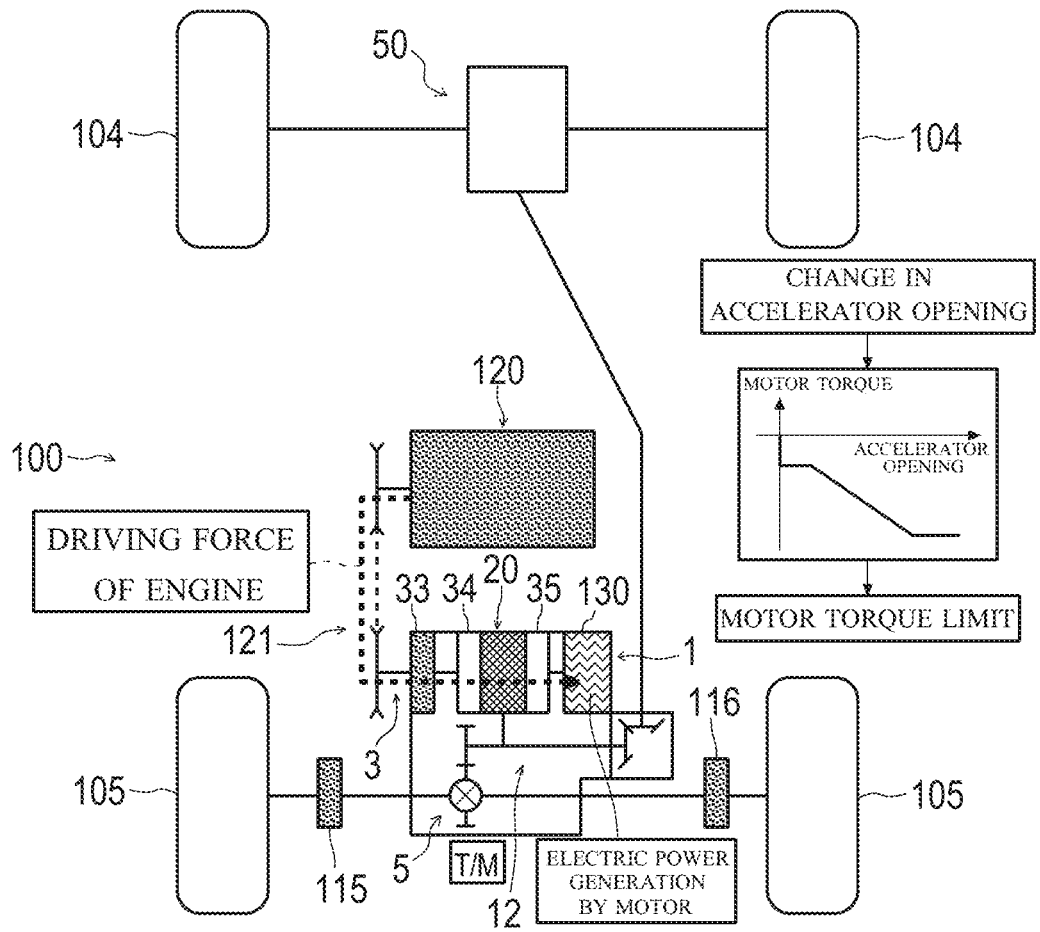
FIGS. 17A and 17B are explanatory diagrams of a REGENERATION mode in the UTV including the axle driving apparatus for a hybrid vehicle.

In a case where the REGENERATION mode is selected by the operation unit 31, according to a signal output from the ECU 32, the internal combustion engine 120 is "turned on", the electric motor 130 is "turned off", the clutch 33 is "engaged", the first brake 34 is "turned off", and the second brake 35 is "turned off", as illustrated in FIGS. 17A and 17B. Then, in the UTV 100, the REGENERATION mode is selected by "turning on" the traveling brakes 115, 116 serving as the third brakes, or the third brake 39 (see FIG. 13).

Then, as illustrated in FIG. 17B, the UTV 100 can generate electric power by driving the electric motor 130 serving as a generator (power generator) by using driving force of the internal combustion engine 120.

In a case where the REGENERATION mode is selected in the UTV 100, electric power generated by the electric motor 130 is stored in the battery 190 (see FIG. 1) and thus the charge capacity of the battery 190 can be restored. Therefore, the UTV can travel a longer distance for a longer time.

In addition, in the REGENERATION mode, in order to reliably keep the UTV 100 stopped by the braking force of the traveling brakes 115, 116 serving as parking brakes, output of the electric motor 130 is limited such that the torque generated by the electric motor 130 becomes a value that can be suppressed by the braking force of the traveling brakes 115, 116 when the accelerator opening is changed, as illustrated in FIG. 17B.

That is, the UTV 100 which is a hybrid vehicle according to the embodiment of the present invention further includes the traveling brakes 115, 116, which are the third brakes that can fix the output shaft 12 in a non-rotatable manner. The input and output switchover unit 30 enables the REGENERATION mode to be selected in which the clutch 33 is "engaged", the first brake 34 is "turned off", the second brake 35 is "turned off", the traveling brakes 115, 116 are "turned on", and the output shaft 12 is fixed in a non-rotatable manner and thus power of the internal combustion engine 120 is output from the output shaft 12 to the electric motor 130. According to such a configuration, in the UTV 100, electric power is generated by the electric motor 130 by using the power of the internal combustion engine 120, and the battery 190 can be charged.

Note that in a case where the UTV 100 includes the axle driving apparatus 2 illustrated in FIG. 13, if the REGENERATION mode is selected by the operation unit 31, as illustrated in FIGS. 17A and 17B, the ECU 32 causes the internal combustion engine 120 to be "turned on", the electric motor 130 to be "turned off", the clutch 33 to be "engaged", the first brake 34 to be "turned off", and the second brake 35 to be "turned on", and furthermore, causes the third brake 39 illustrated in FIG. 13 to be "turned on".

Thus, the output shaft 12 can be fixed in a non-rotatable manner by the third brake gear 40. As a result, the REGENERATION mode is selected.

Next, the state of switching to the EV mode during reversing will be described. The UTV 100 is configured such that when the forward and backward movement switchover lever 118 illustrated in FIG. 11A is switched to "R (reverse)", the driving mode is automatically switched to the EV mode. That is, the UTV 100 is configured to travel by using only the electric motor 130 as a drive source during reversing. In the EV mode during reversing, the rotation direction of the rotary shaft 130a of the electric motor 130 is reversed with respect to the rotation direction in the case of the EV mode during forward movement, and by rotating the rear-wheel driving shafts 6, 6 in the reverse direction, the UTV 100 moves backward.

Figures 18A, 18B:
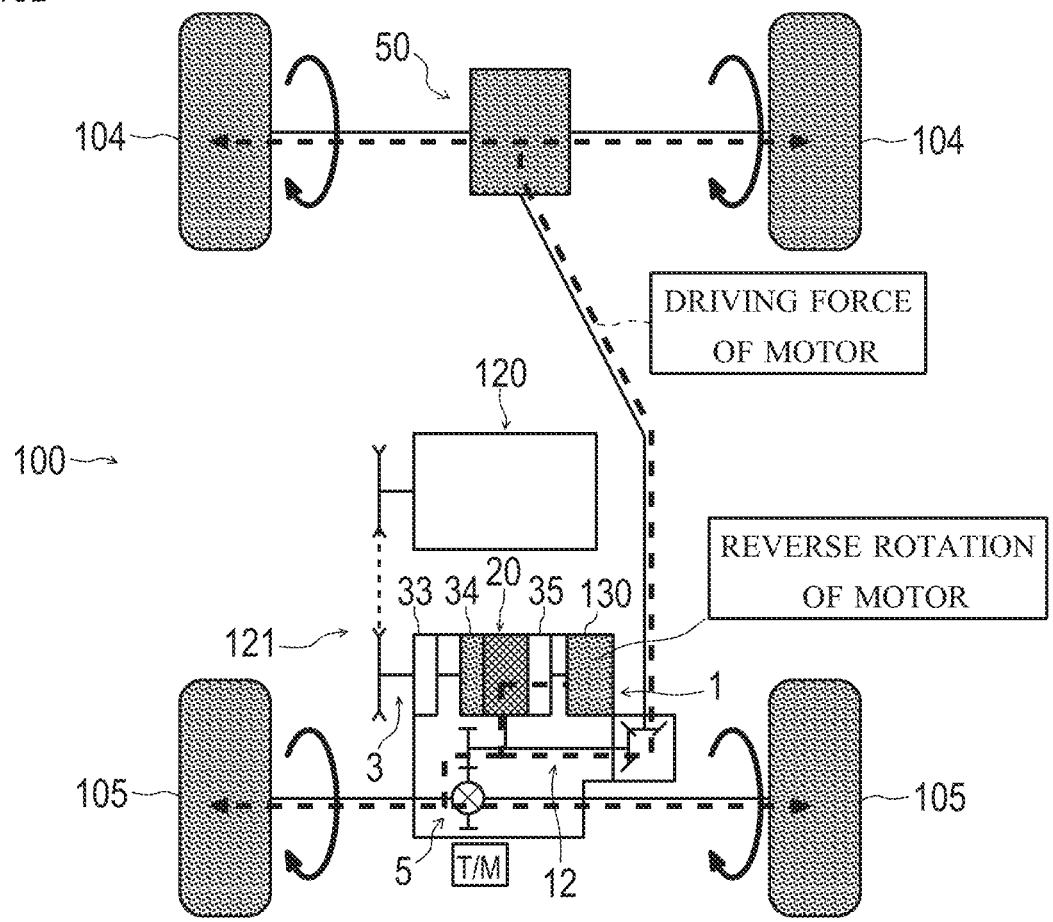
FIGS. 18A and 18B are explanatory diagrams of the EV mode during reversing in the UTV including the axle driving apparatus for a hybrid vehicle.

In a case where the "R" is selected by the forward and backward movement switchover lever 118, according to a signal output from the ECU 32, the internal combustion engine 120 is "turned off", the electric motor 130 is "turned on", the clutch 33 is "disengaged", the first brake 34 is "turned on", and the second brake 35 is "turned off", as illustrated in FIGS. 18A and 18B. Then, as illustrated in FIG. 18B, in the UTV 100, the front wheels 104, 104 and the rear wheels 105, 105 are driven by using only the electric motor 130 in which the rotary shaft 130a is reversely rotated as a drive source. Thus, the UTV 100 can travel backward.

That is, the axle driving apparatus according to the embodiment of the present invention includes: the engine-side input shaft 3 to which power of the internal combustion engine 120 can be input; the motor-side input shaft 10 to which power of the electric motor 130 can be input and can output power to the electric motor 130 that serves as a generator; the output shaft 12 which can output power to the PTO shaft 14 serving as a driving shaft for the front wheels 104, 104 and the rear-wheel driving shafts 6 for the rear wheels 105, 105; the planetary gear mechanism 20 which is an interlocking unit that interlocks the engine-side input shaft 3, the motor-side input shaft 10, and the output shaft 12 such that power can be transmitted from one another; and the input and output switchover unit 30 which enables the input and output system of the planetary gear mechanism 20 to be switched over. The planetary gear mechanism 20 is configured to be capable of switching by the input and output switchover unit 30 between the ENGINE mode, the EV mode, the POWER mode, and the REGENERATION mode. In the ENGINE mode, only power of the internal combustion engine 120 is output from the output shaft 12. In the EV mode, only power of the electric motor 130 is output from the output shaft 12. In the POWER mode, power of the internal combustion engine 120 and power of the electric motor 130 are combined and output from the output shaft 12. In the REGENERATION mode, power of the internal combustion engine 120 is output from the motor-side input shaft 10 to the electric motor 130.

According to the above configuration, the driver can manually change the travel mode according to circumstances in consideration of the condition of a traveling place and the intended usage of the UTV 100. Thus, an optimal travel mode according to the situation can be easily selected.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

Here, a description will be given of an operation unit 200.

Figure 19:
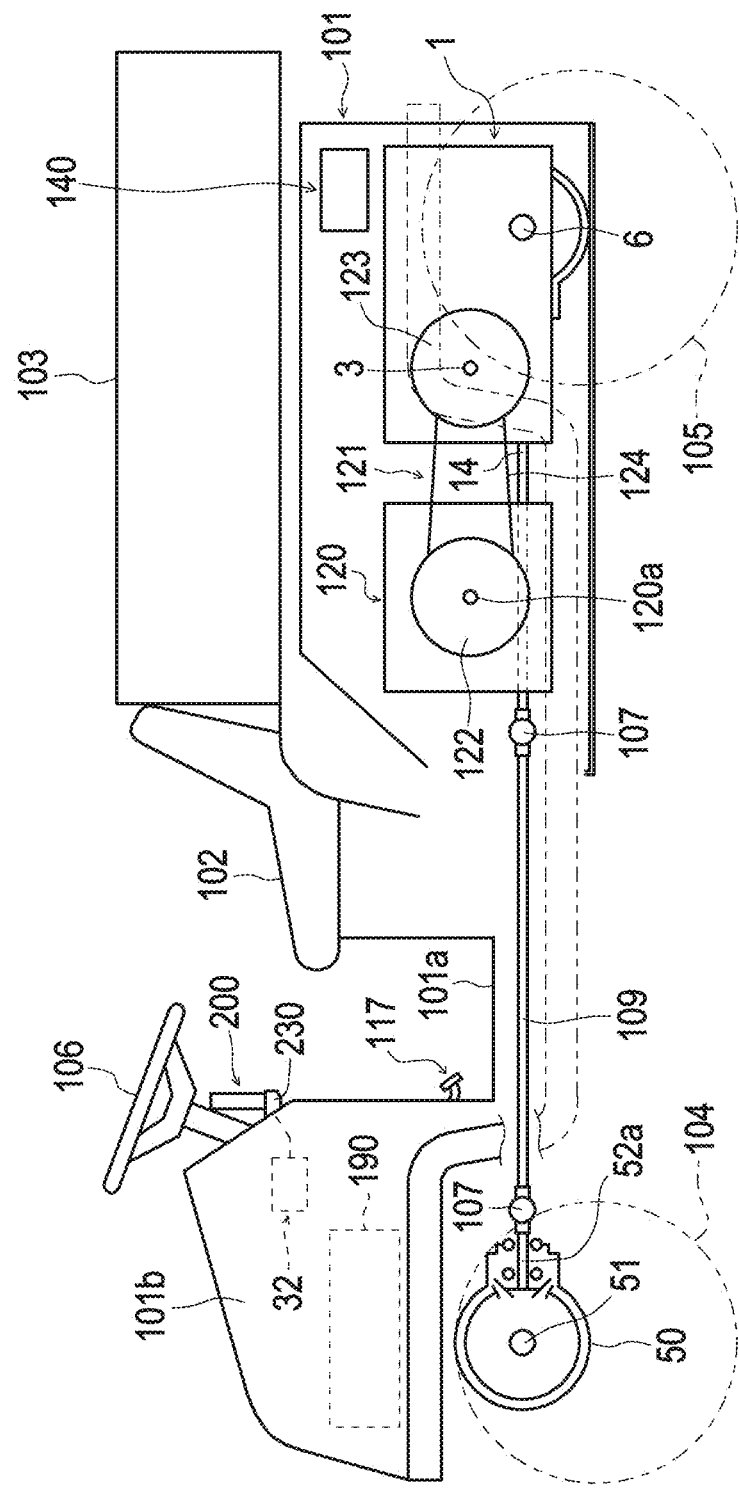
FIG. 19 is a schematic side view illustrating the entire configuration of a working vehicle according to other embodiment of the present invention.

As shown in FIG. 19, a UTV 300 according to other embodiment includes an operation unit 200 which is a unit for operating each unit. As shown in FIG. 19, the operation unit 200 is a section disposed near the steering wheel 106 for the driver of the UTV 300 to artificially operate, in order to switch over the driving mode and operate any working machine.

Figure 20:
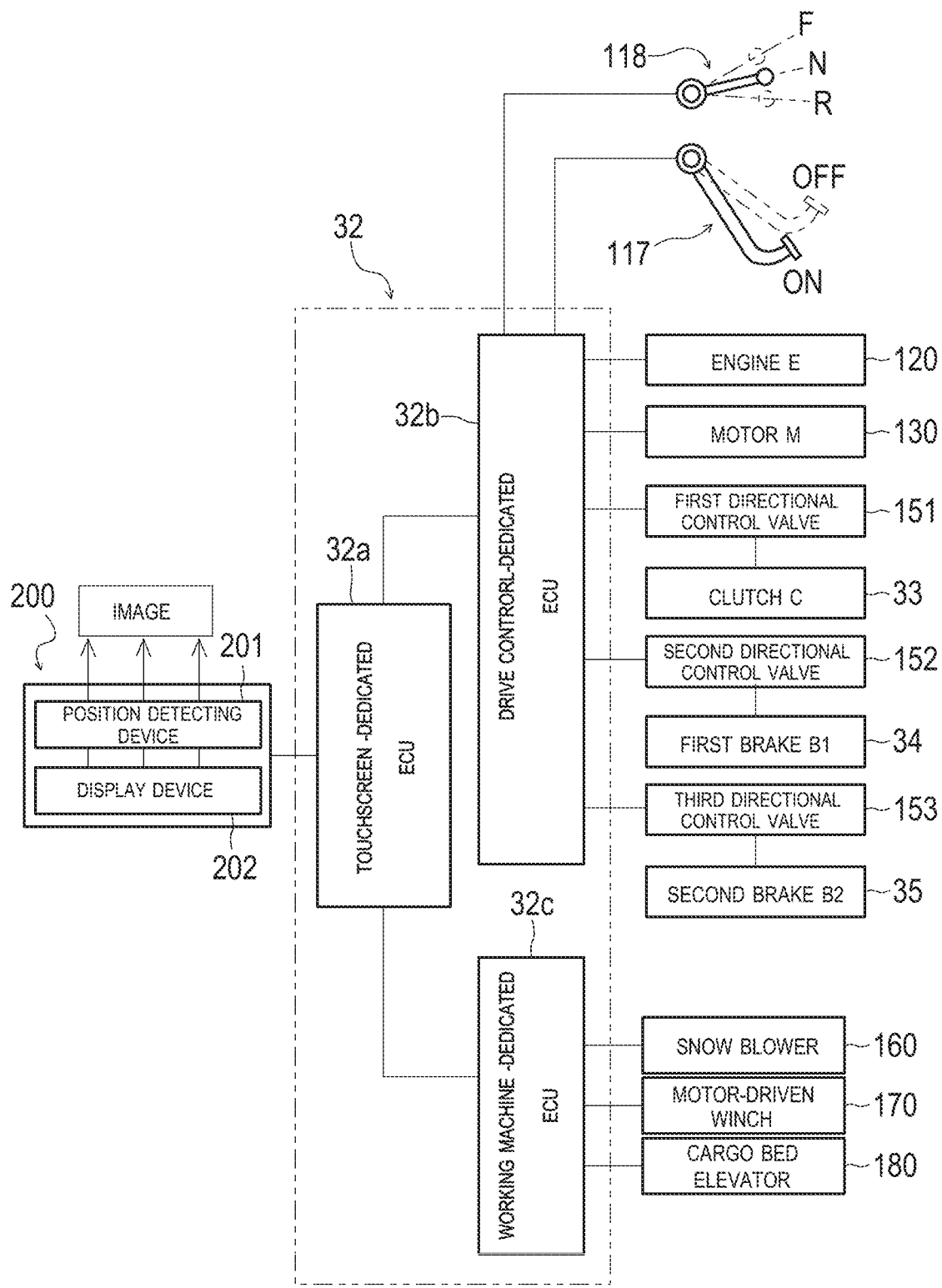
FIG. 20 is a block diagram illustrating the connection status of each unit in the working vehicle according to other embodiment of the present invention.

The operation unit 200 is implemented as a so-called touchscreen. As shown in FIG. 20, the operation unit 200 includes a position detecting device 201 and a display device 202, and is electrically connected to each section of the UTV 300 via the ECU 32.

The position detecting device 201 is a section that the driver touches and operates in order to activate or stop the function of each section of the UTV 300, and is configured to be capable of detecting the positional information of the touched position. The position detecting device 201 is structured by a transparent member capable of transmitting an image, and is configured to allow any image displayed on the display device 202 to be visually recognized through the position detecting device 201. Note that, the position detecting device 201 may be any of various types such as the resistive type, the capacitive type, the optical type, the surface acoustic wave type and the like. The display device 202 is structured by a display apparatus capable of displaying icon images. Further, the display device 202 is provided with a not-shown illuminance sensor, and has the function of automatically adjusting the luminance of the liquid crystal backlight according to the light level around the display device 202.

In the operation unit 200, the position detecting device 201 is overlaid on the front side of the display device 202, so that the driver pressing an icon image displayed on the display device 202 touches the position detecting device 201 which is present before the display device 202. The position detecting device 201 detects the touched position. The operation unit 200 specifies the icon image displayed at the touched position, and activates the function assigned to the icon image.

Figure 21:
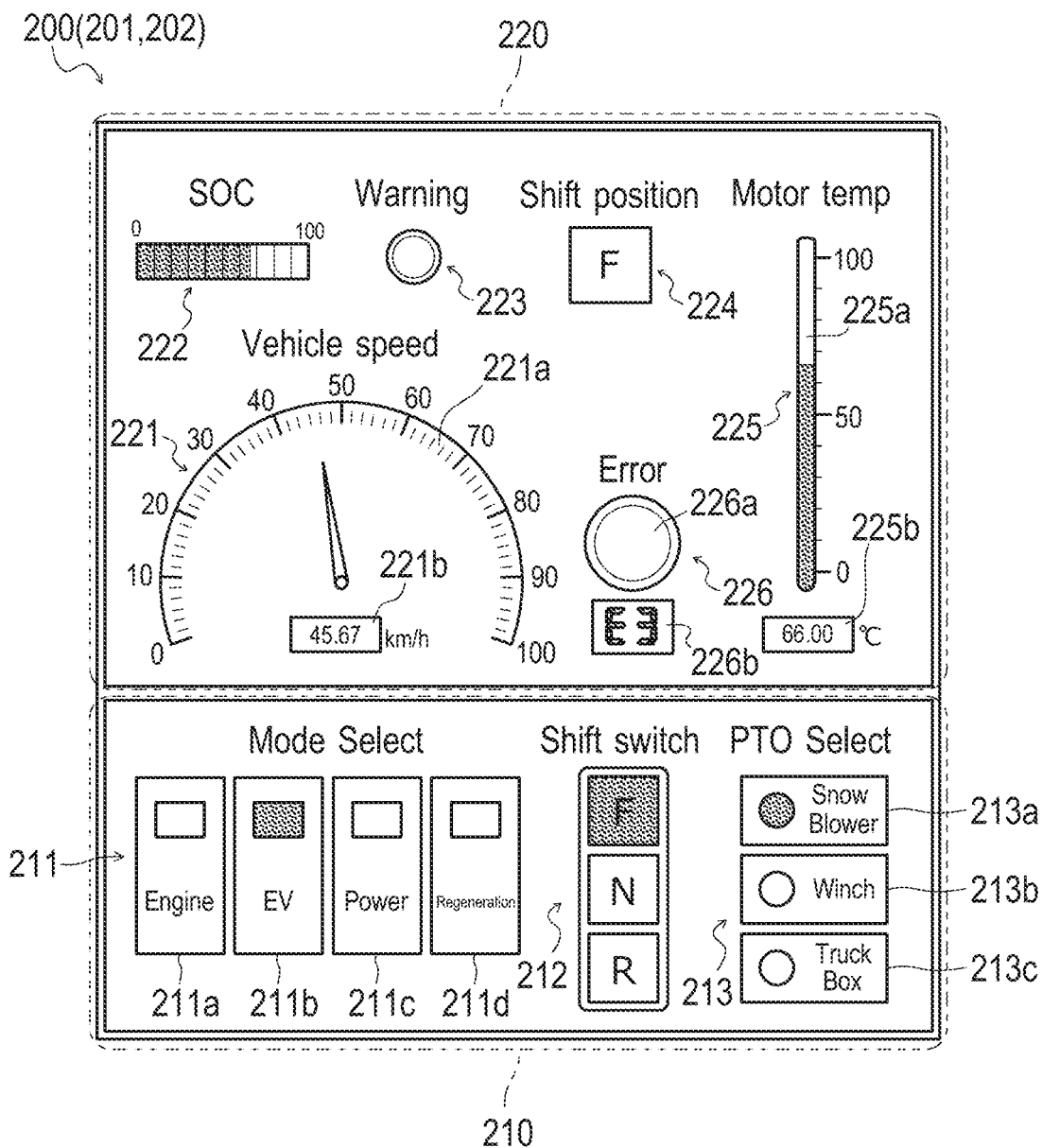
FIG. 21 is a schematic diagram illustrating an operation unit implemented as a touchscreen according to a first embodiment.

The images displayed on the display device 202 and presented to the driver through the position detecting device 201 are, for example, as shown in FIG. 21.

The images displayed on the operation unit 200 (the position detecting device 201 and the display device 202) are, as shown in FIG. 21, divided into an operation-use icon display section 210 which is a section where operation-use icons are grouped and a drive state display section 220 which is a section where drive state displays are grouped.

The operation-use icon display section 210 displays, as the operation-use icons, a mode switchover switch 211, a shift switch 212, and a PTO switch 213.

The mode switchover switch 211 is the operation-use icon that the driver operates in switching the driving mode, and configured of an ENGINE mode icon 211a, an EV mode icon 211b, a POWER mode icon 211c, and a REGENERATION mode icon 211d. By the driver selecting with the mode switchover switch 211, the current mode of the UTV 300 is switched to any of the modes shown in FIG. 11B.

The shift switch 212 is the operation-use icons that the driver operates in switching over among "forward (F)", "backward (R)" and "neutral (N)" of the UTV 300, and configured of a forward icon 212*a*, a neutral icon 212*b*, and a backward icon 212*c*.

FIG. 21 illustrates the operation-use icon display section 210 and the drive state display section 220 according to the first embodiment.

The PTO switch 213 provided on the screen shown in FIG. 21 is the operation-use icon that the driver operates in activating or stopping any of various working machines mounted on the UTV 300. In the present embodiment, the PTO switch 213 is configured of three operation-use icons, namely, a first function icon 213*a*, a second function icon 213*b*, and a third function icon 213*c*. In the present embodiment, the first function icon 213*a* is assigned the function of activating and stopping a motor-driven snow blower 165 mounted on the UTV 300 with as a front attachment. Further, the second function icon 213*b* is assigned the function of activating and stopping a motor-driven winch 170 mounted on the UTV 300 as an attachment. Further, the third function icon 213*c* is assigned the function of activating and stopping a motor-driven elevator mechanism 180 for the cargo bed.

Note that, while the present embodiment illustrates provision of the PTO switch 213 capable of supporting three working machines, it is also possible to add a further operation-use icon to the PTO switch 213, so as to support four or more functions (working machines).

In the UTV 300, by the driver performing an operation of touching any of various operation-use icons of the operation-use icon display section 210, the function assigned to that operation-use icon is activated or stopped.

That is, the operation-use icon display section 210 implemented as a touchscreen in the UTV 300 is capable of displaying operation-use icons which are assigned operational functions of predetermined working machines, respectively.

Such a configuration can easily support any addition or deletion of working functions by changing software, wiring and the like of the operation unit 200.

Figure 22:
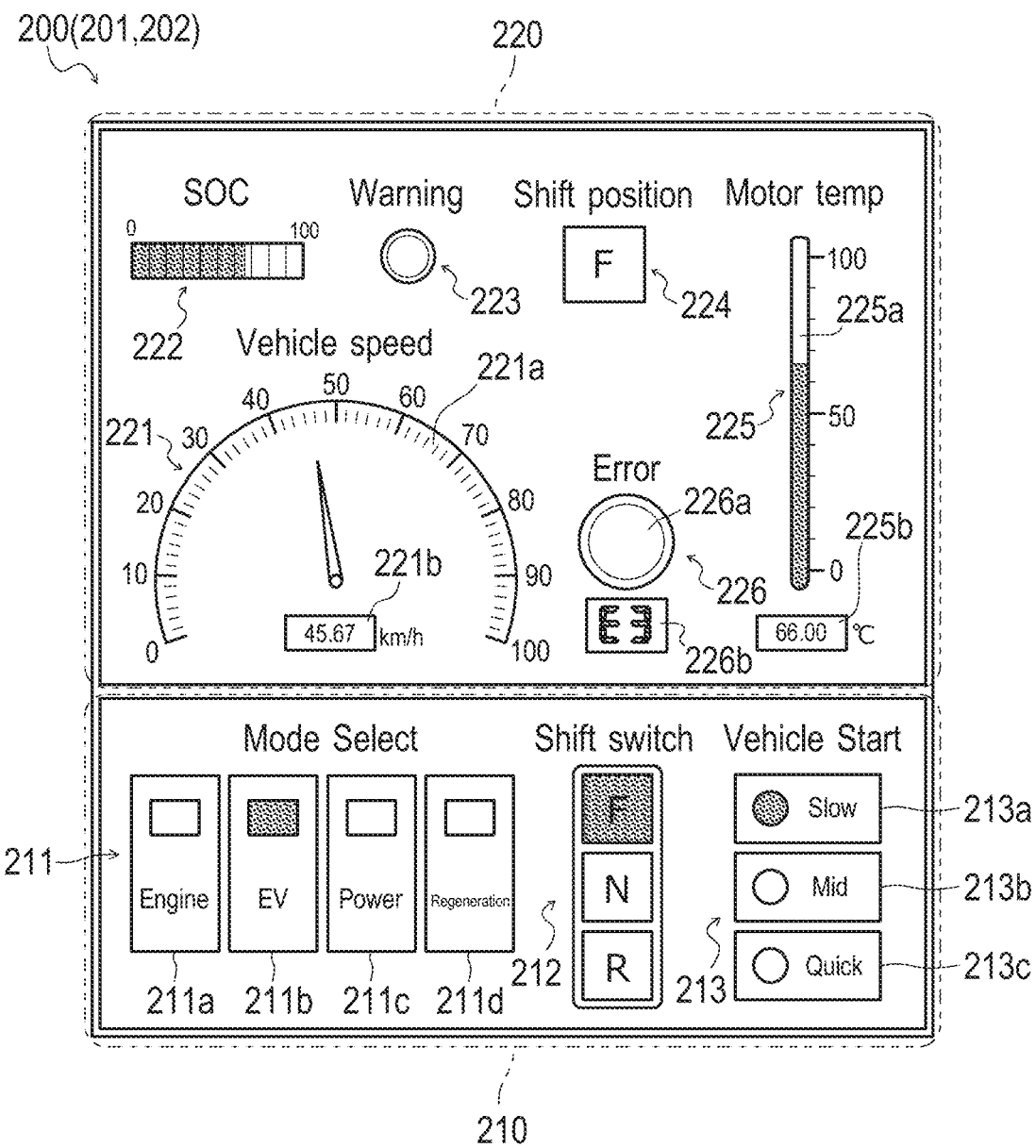
FIG. 22 is a schematic diagram illustrating an operation unit implemented as a touchscreen according to a second embodiment.

Further, FIG. 22 illustrates the operation-use icon display section 210 and the drive state display section 220 according to a second embodiment.

In the screen shown in FIG. 22, what is provided is the PTO switch 213 serving as switchover buttons which allow the driver to select any of three levels of sensitivity of the electric motor 130 in starting the UTV 300 in the EV mode. When the driver presses the "Slow" button which is the first function icon 213*a*, the UTV 300 starts slowly; and when the driver presses the "Quick" button which is the third function icon 213*c*, the UTV 300 starts quickly. Further, when the driver presses the "Mid" button which is the second function icon 213*b*, the UTV 300 normally starts at the intermediate speed between "Slow" and "Quick".

Figure 23:
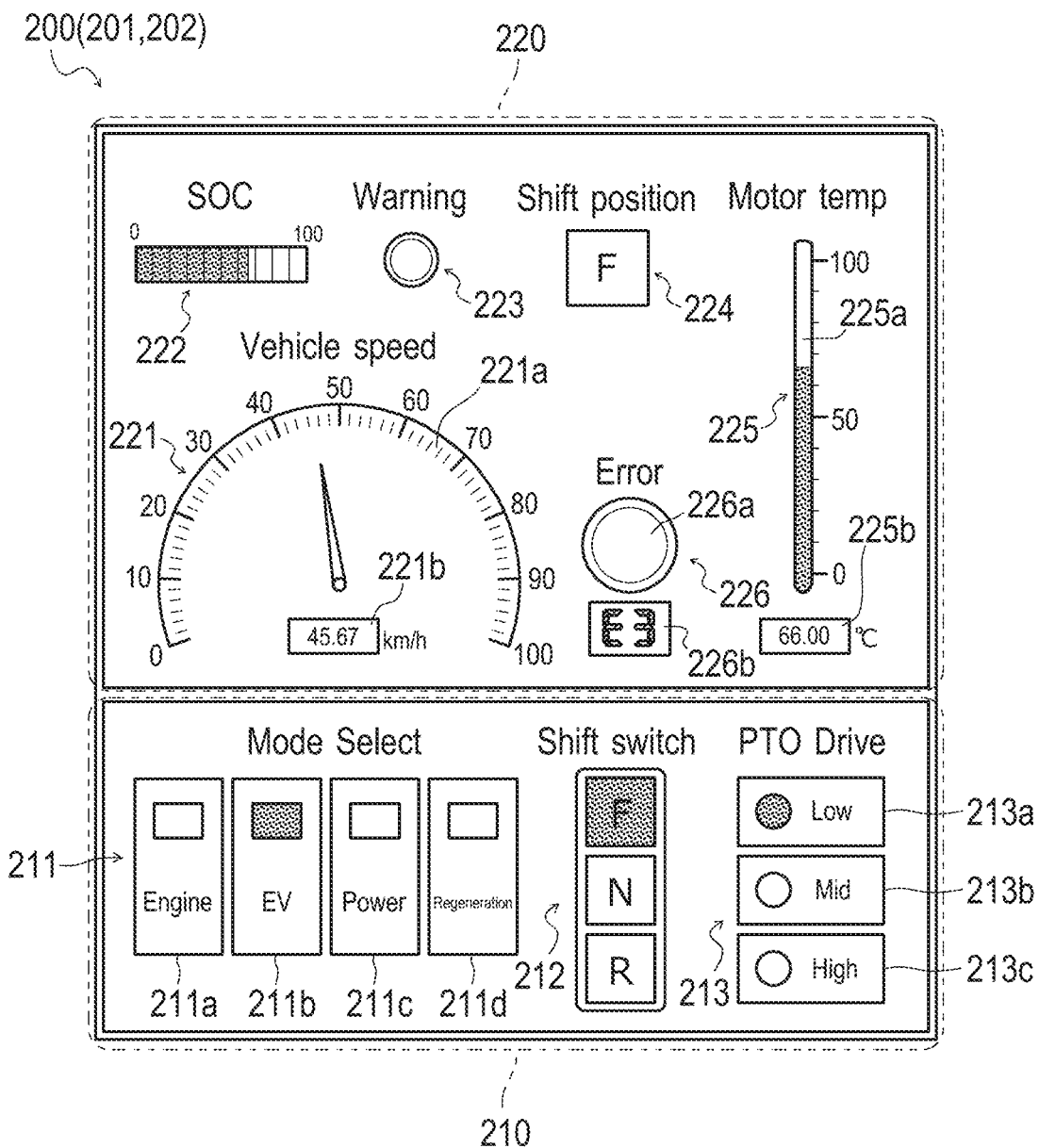
FIG. 23 is a schematic diagram illustrating an operation unit implemented as a touchscreen according to a third embodiment.

Further, FIG. 23 illustrates the operation-use icon display section 210 and the drive state display section 220 according to a third embodiment.

In the screen shown in FIG. 23, what is provided is the PTO switch 213 serving as switchover buttons which allow the driver to select any of three levels of the motor speed of the any working machine (for example, the motor-driven snow blower) mounted on the UTV 300. When the driver assumes that the load on the working machine is great, the driver selects "Low" which is the first function icon 213*a*. When the driver assumes that the load is small and desires to shorten the working time, the driver selects "High" which is the third function icon 213*c*. Further, when the driver selects the "Mid" button which is the second function icon 213*b*, the working machine is driven at the substantially intermediate speed between "Low" and "High".

Note that, while the PTO switch 213 is disposed on the right side of the shift switch 212 in the present embodiment, the PTO switch 213 should be disposed at any place convenient for the driver to operate. For example, the PTO switch 213 may be disposed on the left side of the shift switch 212. Further, as to the PTO switch 213, either one, two, or all the three of "PTO Select (see FIG. 21)" "Vehicle Start (see FIG. 22)" and "PTO Drive (see FIG. 23)" may be displayed. This can be addressed by, in accordance with the specification of the UTV 300, selecting the display content as appropriate, and making any change in the setting of the operation unit 200.

Further, the operation unit 200 implemented as a touchscreen in the UTV 300 is configured to be capable of displaying, on the operation-use icon display section 210, the shift switch 212 which serve as operation-use icons assigned the forward function, the backward function, and the neutral function of the shift lever, respectively.

Such a configuration allows the driver to operate on the operation-use icon display section 210 thereby easily switching over among frontward, backward, and neutral.

Further, the drive state display section 220 of the operation unit 200 includes, as various indicators for indicating the drive state, a speed indicator 221, an SOC indicator 222, a warning indicator 223, a shift position indicator 224, a motor temperature indicator 225, and an error indicator 226. Note that, the drive state display section 220 can include any further indicator for indicating any other information if the information is available from the ECU 32.

The speed indicator 221 is a section for indicating the traveling speed of the UTV 300, and is configured of an analog speed indicator 221*a* and a digital speed indicator 221*b*.

The SOC indicator 222 is a section for indicating the state of charge (SOC) for indicating the charged state of the battery 190 in the UTV 300, and is configured to be capable of indicating the SOC of the battery 190 within a range of 0% to 100% inclusive by a bar graph-like indication.

The warning indicator 223 is a section for indicating an occurrence of abnormality at any unit of the UTV 300, and is configured to alert the driver to the occurrence of abnormality by a warning lamp-like indication.

The shift position indicator 224 is configured to be capable of indicating the shift position selected with the shift switch 212 of the operation-use icon display section 210.

The motor temperature indicator 225 is a section for indicating the temperature of the electric motor 130, and is configured of a bar thermometer-like analog temperature indicator 225*a* and a digital temperature indicator 225*b*.

The error indicator 226 is a section for indicating an occurrence of abnormality at any unit of the UTV 300, and is configured of a warning lamp-like indicator 226*a* and a code indicator 226*b* that indicates a specific error code.

The UTV 300 may be configured so that, by the driver performing an operation of touching any of the sections of the drive state display section 220, the screen transits to a screen that shows the display content of the section in more detail. For example, when the driver touches the speed indicator 221, a graph indication showing the average speed or the traveled distance may appear; when the driver touches the SOC indicator 222, a graph indication showing the change in the charge amount over time may appear; when the driver touches the warning indicator 223, a specific content of the warning may appear; and when the driver touches the error indicator 226, a guide indication showing the location of an error or the solution to the error may appear.

That is, the operation unit 200 implemented as a touchscreen in the UTV 300 includes the drive state display section 220 for displaying the drive state of the UTV 300.

Such a configuration allows the driver to easily check the drive state of the UTV 300 using the drive state display section 220. Further, this configuration enables easier addition of any item desired to be displayed on the drive state display section 220. Still further, this configuration permits deletion of any item not necessarily displayed on the drive state display section 220.

Further, the drive state display section 220 of the UTV 300 includes the error indicator 226 showing abnormality of the UTV 300.

Such a configuration allows the driver to easily check any abnormality of the working vehicle.

Here, a description will be given of the configuration of the ECU.

As shown in FIG. 20, the ECU 32 is a device that outputs a command signal to each unit, which serves as an output unit, of the UTV 300 in response to a driver's operation on the operation unit 200. The ECU 32 is configured of a touchscreen-dedicated ECU 32a, a drive control-dedicated ECU 32b, and a working machine-dedicated ECU 32c.

The touchscreen-dedicated ECU 32a stores image data of the operation-use icons displayed on the drive state display section 220 of the operation unit 200 and information on the displayed position of the images. Further, the touchscreen-dedicated ECU 32a stores information on the functions that is activated in response to any operation performed on the operation-use icon display section 210.

These pieces of information stored in the touchscreen-dedicated ECU 32a can be added, changed, or deleted.

The touchscreen-dedicated ECU 32a is connected to the operation unit 200, the drive control-dedicated ECU 32b, and the working machine-dedicated ECU 32c. In response to an output signal from the touchscreen-dedicated ECU 32a, any corresponding operation-use icon is displayed on the drive state display section 220. In response to a driver's operation on the operation-use icon display section 210, the touchscreen-dedicated ECU 32a outputs a command signal to each of the drive control-dedicated ECU 32b and the working machine-dedicated ECU 32c.

The drive control-dedicated ECU 32b is an apparatus for controlling the drive of the UTV 300, and is connected to the internal combustion engine 120, the electric motor 130, and a plurality of directional control valves 151, 152, 153 for switching over the input and output system of power for the axle driving apparatus 1. The drive control-dedicated ECU 32b is configured to be capable of switching over the driving mode of the UTV 300 by switching over "ON" "OFF" of the internal combustion engine 120, the electric motor 130, and the directional control valves 151, 152, 153 in response to a driver's operation on the operation-use icon display section 210.

The working machine-dedicated ECU 32c is an apparatus for controlling the drive state of any working machine mounted on the UTV 300. To the working machine-dedicated ECU 32c according to the present embodiment, the snow blower 165, the motor-driven winch 170, and the elevator mechanism 180 for the cargo bed are connected. In response to a driver's operation on the operation-use icon display section 210, the working machine-dedicated ECU 32c is capable of switching "ON" "OFF" of the snow blower 165, the motor-driven winch 170, and the elevator mechanism 180 for the cargo bed.

In the UTV 300, a new working machine can easily be added by the operator adding or changing the information stored in the touchscreen-dedicated ECU 32a. In this case, just the changing the program of the operation unit 200 will suffice, eliminating concerns for availability of the space for adding an operation switch around the driver's seat.

Further, in the UTV 300, the information stored in the operation unit 200 can be customized according to the preference of the operator, by the operator changing the information stored in the touchscreen-dedicated ECU 32a. Alternatively, the information that the operator feels unnecessary can be hidden by the operator deleting the information stored in the touchscreen-dedicated ECU 32a. Thus, expandability and customizability of the UTV 300 improve.

Figure 24:
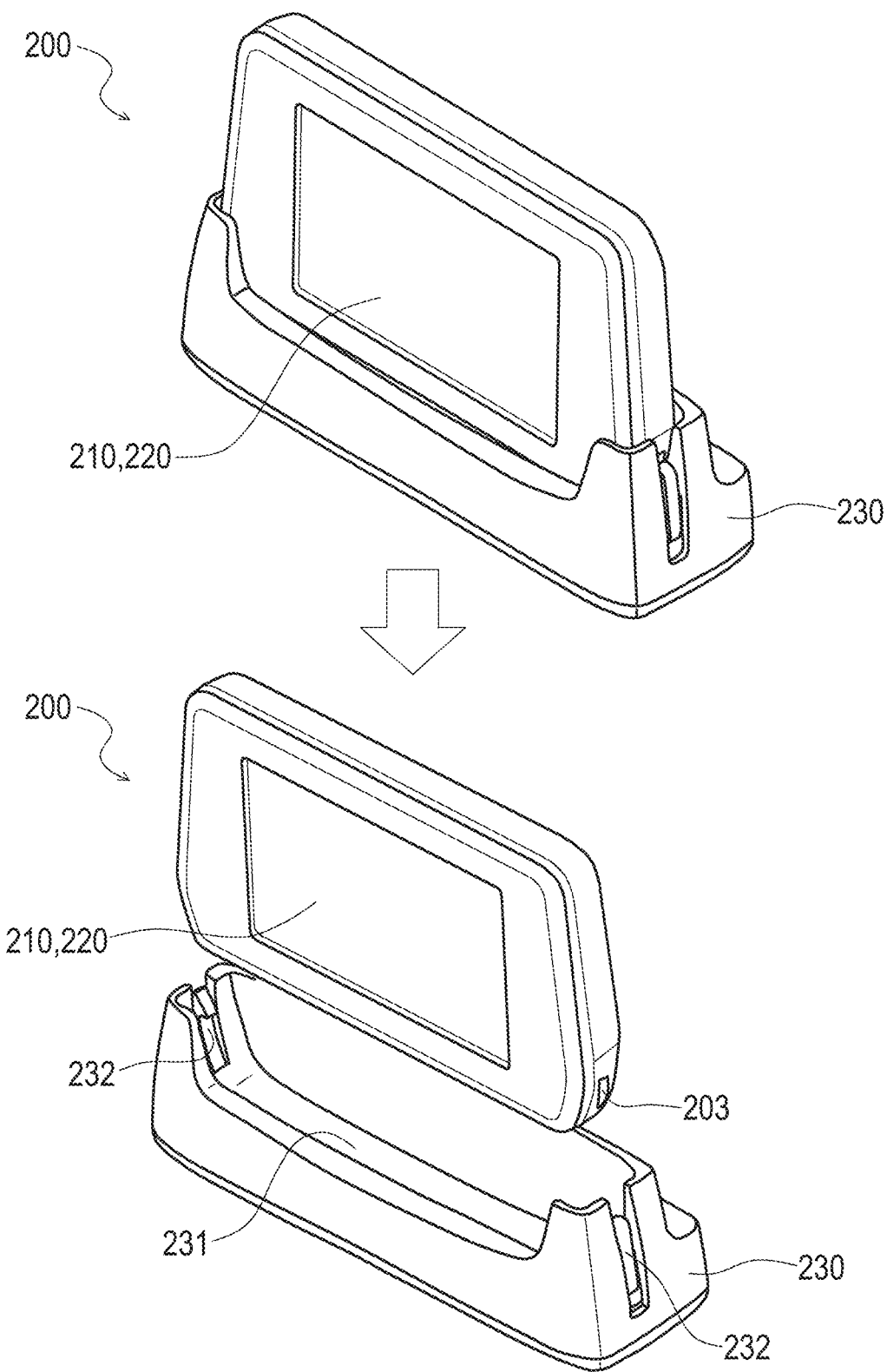
FIG. 24 is a schematic perspective view illustrating an operation unit configured to be removably attached to a holder.

Further, the operation unit 200 that the UTV 300 according to the present embodiment has the shape shown in FIG. 24, and is removably attached to a holder 230.

In the UTV 300, as shown in FIG. 19, the holder 230 is disposed at the body around the driver's seat 102 (for example, a section in the front cover 101b corresponding to the dashboard), and the operation unit 200 is attached to the holder 230. This configuration allows the driver seated on the driver's seat 102 to operate the operation unit 200.

As shown in FIG. 24, at the holder 230, a recess 231 that conforms to the shape of the lower part of the operation unit 200 so as to be capable of fitting to and retaining the operation unit 200 is formed. Further, the holder 230 includes engaging nails 232, 232 for engaging with the operation unit 200 fitted into the recess 231. Thus, the holder 230 engages, by the engaging nails 232, 232, with recesses 203, 203 of the operation unit 200 fitted into the recess 231, thereby retaining the operation unit 200.

Further, the operation unit 200 that the UTV 300 according to the present embodiment includes is configured to be capable of communicating with the holder 230. The communication between the operation unit 200 and the holder 230 may be wireless communication established by a wireless LAN, Bluetooth (registered trademark) or the like. The operation unit 200 is configured to be capable of issuing a command to the ECU 32 via the holder 230 while being removed from the holder 230. Note that, the communication between the operation unit 200 and the holder 230 may be established in a wired manner. In this case, the remote operation is enabled within a range of the communication line.

Thus, in the UTV 300, the operation unit 200 can be used as a remote controller, and the driver is allowed to remotely perform various operations on the UTV 300 while being absent from the driver's seat 102.

Note that, it is also possible for the operation unit 200 to be connected to the holder 230 in a wired manner when retained by the holder 230, and connected to the holder 230 in a wireless manner when removed from the holder 230. That is, the operation unit 200 may have a combination of the wired function and the wireless function. Further, the holder 230 may have the function as a charger for charging the battery of the operation unit 200.

That is, the operation unit 200 of the UTV 300 is removably attached to the body (the front cover 101b) around the driver's seat 102, and has the wireless communication function.

This configuration achieves a remote operation. Thus, the driver is capable of driving and operating the UTV 300 and the working machines (the snow blower 165, the motor-driven winch 170, the elevator mechanism 180 for the cargo bed and the like) while the driver is absent from the driver's seat 102.

In the UTV 300, the operation unit 200, the ECU 32, the clutch 33, the first brake 34, and the second brake 35 serving as output units switch over the input and output system of power for the axle driving apparatus 1.

That is, the UTV 300 is a working vehicle that includes the operation unit 200 serving as a user interface with which the driver inputs an operation around the driver's seat 102. The operation unit 200 is configured of the operation-use icon display section 210 implemented as a touchscreen capable of displaying operation-use icons respectively assigned predetermined functions, and the drive state display section 220.

Such a configuration can easily address to an increase or a reduction in the number of operation target devices by the operator adding or changing the operation-use icons assigned the working functions. Thus, any operation switch for turning on or off a working machine can be easily added or changed, whereby any addition or change in any of various working functions can be addressed.

For the axle driving apparatus 1, as shown in FIG. 21, in the touchscreen-like operation unit 200 disposed near the driver's seat 102 (see FIG. 19) of the UTV 300, the mode switchover switch 211 is disposed. As shown in FIG. 20, the operation unit 200 including operation-use icon-like switches is connected to the ECU (electronic control unit) 32. By the driver selecting any of the switches of the mode switchover switch 211 thereby selecting the driving mode, a command signal indicative of the selecting the driving mode is input to the drive control-dedicated ECU 32b.

In the UTV 300, when "F (forward)" is selected with the shift switch 212 (see FIG. 21) and the brake pedal 117 (see FIG. 20) is not depressed (that is, the traveling brakes 115, 116 serving as parking brakes are "OFF"), by the driver artificially selecting the EV mode icon 211b (see FIG. 21) with the mode switchover switch 211, the driving mode is switched to the EV mode.

In a case where the EV mode icon 211b is selected with the mode switchover switch 211 (see FIG. 21), according to a signal output from the drive control-dedicated ECU 32b (see FIG. 20), the internal combustion engine 120 is turned "OFF"; the electric motor 130 is turned "ON"; the clutch 33 is turned "OFF"; the first brake 34 is turned "OFF"; and the second brake 35 is turned "ON".

In the UTV 300, when "F (forward)" is selected with the shift switch 212 (see FIG. 21) and the brake pedal 117 (see FIG. 20) is not depressed (that is, the traveling brakes 115, 116 serving as parking brakes are "OFF"), by the driver artificially selecting the POWER mode icon 211c with the mode switchover switch 211 (see FIG. 21), the driving mode is switched to the POWER mode.

In a case where the POWER mode icon 211c is selected with the mode switchover switch 211 (see FIG. 21), according to a signal output from the drive control-dedicated ECU 32b (see FIG. 20), the internal combustion engine 120 and the electric motor 130 are both turned "ON"; the clutch 33 is turned "ON"; the first brake 34 is turned "ON"; and the second brake 35 is turned "OFF".

In the UTV 300, when "N (neutral)" is selected with the shift switch 212 (see FIG. 21) and the brake pedal 117 (see FIG. 20) is depressed (that is, the traveling brakes 115, 116 serving as parking brakes are turned "ON"), by the driver artificially selecting the REGENERATION mode icon 211d with the mode switchover switch 211 (see FIG. 21), the driving mode is switched to the REGENERATION mode.

In a case where the REGENERATION mode icon 211d is selected with the mode switchover switch 211 (see FIG. 21), according to a signal output from the drive control-dedicated ECU 32b (see FIG. 20), the internal combustion engine 120 is turned "ON"; the electric motor 130 is turned "OFF"; the clutch 33 is turned "ON"; the first brake 34 is turned "OFF"; and the second brake 35 is turned "ON". Then, in the UTV 300, by the traveling brakes 115, 116 serving as the third brakes or the third brake 39 being turned "ON", the driving mode is switched to the REGENERATION mode.

The UTV 300 is configured such that, when the backward icon 212c is selected with the shift switch 212 (see FIG. 21), the driving mode is automatically switched to the EV mode.

In a case where the backward icon 212c is selected with the shift switch 212 (see FIG. 21), according to a signal output from the drive control-dedicated ECU 32b (see FIG. 20), the internal combustion engine 120 is turned "OFF"; the electric motor 130 is turned "ON"; the clutch 33 is turned "OFF"; the first brake 34 is turned "OFF"; and the second brake 35 is turned "ON".

That is, the UTV 300 is a hybrid working vehicle that includes: the internal combustion engine 120 and the electric motor 130 serving as power sources; the axle driving apparatus 1 to which power of the internal combustion engine 120 and the electric motor 130 can be input and can be switched over to a plurality of driving modes; and the mode switchover switch 211 serving as an input and output switchover unit which allows the input and output system of the axle driving apparatus 1 to be artificially switched over. The operation unit 200 implemented as a touchscreen is configured to be capable of displaying the icons 211a, 211b, 211c, 211d which are assigned the operational functions of the mode switchover switch 211, respectively.

According to the above configuration, by operating on the operation unit 200 implemented as a touchscreen, the driver can switch over the driving mode of the UTV 300.

According to the above configuration, the driver can more easily perform the operation of switching over the driving mode in the UTV 300.

What is claimed is:

1. An axle driving apparatus for a hybrid utility vehicle comprising an internal combustion engine, an electric motor, and a wheel having a driving shaft, the axle driving apparatus comprising:
   a first rotary shaft to which power of the internal combustion engine can be input;
   a second rotary shaft to which power of the electric motor can be input and which can output power to the electric motor that serves as a generator;
   a third rotary shaft which can output power to the driving shaft of the wheel;
   an interlocking unit which interlocks the first rotary shaft, the second rotary shaft, and the third rotary shaft such that power can be transmitted between the first rotary shaft, the second rotary shaft, and the third rotary shaft; and
   an input and output switchover unit structured to enable an input and output system of the interlocking unit to be manually switched over, wherein
   the interlocking unit and the input and output switchover unit are structured such that the interlocking unit is switched between:
      a first mode in which only the power of the internal combustion engine is output from the third rotary shaft,
      a second mode in which only the power of the electric motor is output from the third rotary shaft, a third mode in which the power of the internal combustion engine and the power of the electric motor are combined and output from the third rotary shaft, and a fourth mode in which the power of the internal combustion engine is output from the second rotary shaft to the electric motor, wherein the interlocking unit comprises a planetary gear mechanism comprising an internal gear which is interlocked with the first rotary shaft, a sun gear which is interlocked with the second rotary shaft, a plurality of planetary gears which meshes with the internal gear and the sun gear, and a planetary carrier which supports the plurality of planetary gears and is interlocked with the third rotary shaft, the input and output switchover unit comprises:

a clutch which is provided on the first rotary shaft and structured to engage and disengage power transmission from the internal combustion engine;

a first brake structured to fix the internal gear and fix the first rotary shaft in a non-rotatable manner by fixing the internal gear; and a second brake structured to fix the sun gear and fix the second rotary shaft in a non-rotatable manner by fixing the sun gear, the clutch, the first brake, and the second brake are structured to operate independently from each other, and in the first mode, the clutch is engaged, the first brake is turned off, the second brake is turned on, and only the power of the internal combustion engine is output from the third rotary shaft.

2. The axle driving apparatus according to claim 1, wherein in the second mode, the clutch is disengaged, the first brake is turned on, the second brake is turned off, and only the power of the electric motor is output from the third rotary shaft.

3. The axle driving apparatus according to claim 1, wherein in the third mode, the clutch is engaged, the first brake is turned off, the second brake is turned off, and the power of the internal combustion engine and the power of the electric motor are combined and output from the third rotary shaft.

4. The axle driving apparatus according to claim 1 further comprising a third brake structured to fix the third rotary shaft in a non-rotatable manner, wherein in the fourth mode the clutch is engaged, the first brake is turned off, the second brake is turned off, the third brake is turned on, the third rotary shaft is fixed in a non-rotatable manner, and the power of the internal combustion engine is output from the second rotary shaft to the electric motor.

5. The axle driving apparatus according to claim 1 further comprising a continuously variable transmission which is provided between the internal combustion engine and the first rotary shaft, wherein the continuously variable transmission is structured to change speed of the power of the internal combustion engine and input the power to the first rotary shaft.

* * * * *